United States Patent
Yang et al.

(10) Patent No.: US 8,290,833 B2
(45) Date of Patent: Oct. 16, 2012

(54) MULTI-STAGE SUPPLY CHAIN MANAGEMENT SYSTEM WITH DYNAMIC ORDER PLACEMENT

(75) Inventors: Lou Ping Yang, Monte Sereno, CA (US); Mingtang Thomas Yin, Saratoga, CA (US); Edwin Law, Saratoga, CA (US); Siqing Wei, Fremont, CA (US); Johnson Lee, Saratoga, CA (US)

(73) Assignee: E2Open, Inc., Redwood City, CA (US)

( * ) Notice: Subject to any disclaimer, the term of this patent is extended or adjusted under 35 U.S.C. 154(b) by 607 days.

(21) Appl. No.: 12/435,221

(22) Filed: May 4, 2009

(65) Prior Publication Data
US 2009/0259527 A1     Oct. 15, 2009

Related U.S. Application Data

(63) Continuation of application No. 10/172,183, filed on Jun. 14, 2002, now Pat. No. 7,529,695.

(51) Int. Cl.
*G06Q 10/00* (2012.01)
(52) U.S. Cl. ........... 705/28; 705/22; 705/26.2; 235/379; 235/380; 235/381; 235/382; 235/383
(58) Field of Classification Search ..................... 705/28
See application file for complete search history.

(56) References Cited

U.S. PATENT DOCUMENTS

| | | | |
|---|---|---|---|
| 5,943,484 A | 8/1999 | Milne et al. | |
| 5,974,395 A | 10/1999 | Bellini et al. | |
| 6,002,344 A | 12/1999 | Bandy et al. | |
| 6,026,378 A | 2/2000 | Onozaki et al. | |
| 6,041,267 A | 3/2000 | Dangat et al. | |
| 6,049,742 A | 4/2000 | Milne et al. | |
| 6,088,626 A | 7/2000 | Lilly et al. | |
| 6,151,582 A | 11/2000 | Huang et al. | |
| 6,341,271 B1 | 1/2002 | Salvo et al. | |
| 6,459,949 B1 | 10/2002 | Black et al. | |

(Continued)

FOREIGN PATENT DOCUMENTS

JP     2001297185 A  *  10/2001

(Continued)

OTHER PUBLICATIONS

Borland. "Borland's Paradox for Windows User's Guide." 1994, pp. 1-333, Borland International, Inc.

(Continued)

*Primary Examiner* — James A Reagan
(74) *Attorney, Agent, or Firm* — Dorsey & Whitney LLP

(57) ABSTRACT

A global supply chain management system in an environment of multiple suppliers forming supply chains for one or more buyers connected over the Internet. The system includes a global processor with logic that maps "local" supply information for each buyer and each supplier, represented in one or more property tables having master information correlated to local information for each buyer and each supplier. The system manages processes from an input of lots to an output through supplier stages where clients each use fragmented different local information. A correlation means uses base lot indicators, one for each of the lots in common for all of said stages and executes supply chain management functions for tracking lots through the supplier stages and for dynamic creation of sets of purchase orders among groups of suppliers for processing the same lot through the supply chain.

4 Claims, 22 Drawing Sheets

U.S. PATENT DOCUMENTS

| | | | |
|---|---|---|---|
| 6,601,071 B1 | 7/2003 | Bowker et al. | |
| 2002/0138316 A1 | 9/2002 | Katz et al. | |
| 2002/0147622 A1* | 10/2002 | Drolet et al. | 705/7 |
| 2003/0033179 A1* | 2/2003 | Katz et al. | 705/7 |
| 2003/0065415 A1 | 4/2003 | Hedge et al. | |
| 2003/0158769 A1* | 8/2003 | Uno et al. | 705/8 |
| 2003/0225474 A1 | 12/2003 | Mata et al. | |

FOREIGN PATENT DOCUMENTS

| | | |
|---|---|---|
| JP | 2006285590 | 10/2006 |

OTHER PUBLICATIONS

Borland. "Borland's ReportSmith for Windows User's Guide." 1994, pp. 1-134, Borland International, Inc.

Derfler. "How Networks Work." Millennium Edition, Jan. 2000, pp. 1-219, Que Corporation.

Getsilicon.com. "GetSilicon launches first internet exchange for semiconductor manufacturing outsourcing industry." Press Release, Dec. 4, 2000.

Getsilicon.Com. "GetSilicon partners with Vitria." Press Release, Jan. 15, 2001.

White. "How computers work." Millennium Edition, Sep. 1999, pp. 1-279, Que Corporation.

Greene. "Production and inventory control handbook." 1997, 3rd edition, McGraw-Hill Companies, Inc.

Sokol. "EDI, the competitive edge." 1989, pp. 1-346, Multiscience Press Inc.

Vitria.com. "GetSilicon.net partners with Vitria." Press Release, Jan. 15, 2001.

Vitria.com. "Vitria announces support for web services." Press Release, Oct. 22, 2001.

Vitria.com. "Vitria introduces VCML to standardize business collaboration across the extended enterprise." Press Release, Oct. 10, 2001.

\* cited by examiner

FIG. 14

Lot Tracking Report

Wednesday, Sept 05, 2001 6:18:49 PM (local time)

Please input a lot number (priority search criteria): [ ]

OR select by Device: [ 9051BWBA ]   Base Lot Number: [ N1805 ]   [ Get Report ]

| Base Lot | Lot No | Part No | Routing | Unit | Sup | Received Date | Received Qty | Start Date | Comleted Date | Completed Qty | Ship Date | Ship Qty | Order No | Yield (%) | Cycle Time |
|---|---|---|---|---|---|---|---|---|---|---|---|---|---|---|---|
| N1805 | N1805 | | Fab | wafer | fabc | | | 1/08/2001 | 02/08/2001 | 25 | 2/28/2001 | 25 | 200363 | | 51 |
| N1805 | N1805 | | Wafer Sort | Die | testa | 3/01/2001 | 67,250 | 3/02/2001 | 03/09/2001 | 64,514 | 3/09/2001 | 64,514 | 600079 | 95.9 | 7 |
| N1805 | N18058 | IS41C16256 35K | Assembly | Die | pkgk | 3/04/2001 | 64,514 | 4/09/2001 | 4/19/2001 | 64,393 | 4/21/2001 | 64,393 | 361258 | 99.8 | 10 |
| N1805 | N18058.1 | IS41C16256 35K | Final Test | Die | pkg/lp | 4/21/2001 | 23,162 | 4/21/2001 | 5/13/2001 | 21,760 | 8/13/2001 | 21,760 | 351657 | 93.3 | 22 |
| N1805 | N18058.2 | IS41C16256 35K | Final Test | Die | pkg/lp | 8/14/2001 | 22,879 | 8/14/2001 | 8/22/2001 | 20,873 | 8/22/2001 | 20,873 | 351661 | 91.2 | 8 |
| N1805 | N18058.3 | IS41C16256 35K | Final Test | Die | pkg/lp | 8/23/2001 | 21,760 | 8/23/2001 | | | | | 351665 | | |

FIG. 17

Actual Cost-Lot Detail Report

Vendor: *pkgftp*  Process: FinalTest  Lot No: N1805S.1  [Get Report]

Part No: IS41G16256-35K
Device: 9051BWBA  BPO No: 700000691
Requestor Name: Jennifer Lovejoy
Department Name & No: Manufacture 44  PO No: 350001657

| Order Qty | Process | Description | Unit price (US$) | Est Amount | Complete Date | Actual Qty | Actual Charge | RE-Test | Approve | Approve Name |
|---|---|---|---|---|---|---|---|---|---|---|
| 24,000 | PRE75 | 100% Pre BI @75C | $0.061 | $1464 | 5/09/2001 | 23,162 | $1412.88 | ☐ | ☐ | |
| 24,000 | BI6 | 100% BI @16hrs,125C | $0.050 | $1200 | 5/11/2001 | 22,662 | $1464.30 | | | |
| 24,000 | POST75 | 100% Post BI Test@75C | $0.080 | $1920 | 5/12/2001 | 22,162 | $1772.96 | | | |
| 24,000 | FT-5 | 100% F/T @-5C | $0.065 | $1560 | 5/13/2001 | 21,862 | $1421.03 | ☐ | ☐ | |
| 24,000 | LS | 100% Lead Scan | $0.015 | $360 | 5/13/2001 | 21,760 | $326.40 | ☐ | ☐ | |
| 24,000 | Bake+DP | Bake & Dry Pack on Tray | $0.015 | $120 | 5/13/2001 | 21,760 | $108.80 | | | |
| | | | Total Price | $6072 | | | $6679.20 | | | |

FIG. 19
Final Test Purchase Order

| | | | | |
|---|---|---|---|---|
| Part No | IS41G16256-35K | | Date | 2002/02/15 |
| | | | BPO No | 700000691 |
| Device | 9051BWBA | | PO No | 350001657 |
| Lot No | W3146900DM2 | | Revision No | 01 |
| Requester Name | Jennifer Lovejoy | | Purchase Office | USA |
| Planner Code | 1212 | | | |
| Depart Name & No | 44 | | Routing Code | 301 |
| | | | Routing Desc | Final test |
| Supplier | pkgftp | | Payment Term | Net 30 |
| Ship To | CUST | | Prepaid | |
| FOB Point | San Francisco | | Ship Via | BEST WAY |

| QTY | STEP | Description | Unit Price. | Extension. |
|---|---|---|---|---|
| 24,000 | PRE75 | 100% Pre B/I A@75C | 0.061 | 1464.00 |
| 24,000 | FT-5 | 100% F/T - 5C | 0.065 | 1560.00 |
| 24,000 | LS | 100% Lead Scan | 0.015 | 360.00 |
| | | | | |

Total Price
Remaining Balance

ATTACHMENTS

File Name

APPROVEAL

DEPT   Name
Manager  Jim Jones   Required
Assembly  James Smith

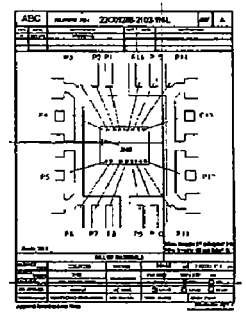

FIG. 21

Wafer Rolling Output Report

Device: 500GACVE1    From Week: Week12    To Week: Week26    [Get Report]

| PO No | PO DATE | PO DEVICE | W-12 2002-03-23 | ... | W-18 2002-05-04 | W-19 2002-05-11 | W-20 2002-05-18 | W-21 2002-05-25 | ... | W-26 2002-06-29 | FIN | WIP | HOLD | TO START |
|---|---|---|---|---|---|---|---|---|---|---|---|---|---|---|
| 200000359 | 01/15/2001 | 5006ACVE1 | | | | | 90 | | | | 0 | 90 | 0 | 10 |
| 200000416 | 11/14/2001 | 5006ACVE1 | | | | 97 | 100 | | | | 100 | 120 | | |
| 200000428 | 12/11/2001 | 5006ACVE1 | 47 | | | 120 | | 23 | | | 120 | 0 | | |
| 200000428 | 12/11/2001 | 5006ACVE1 | 100 | | | | | | | 48 | 47 | 48 | 0 | 53 |
| 200000469 | 03/13/2001 | 5006ACVE1 | | | 48 | 48 | | | | 48 | 100 | 48 | 0 | 0 |
| | | | | | | | | | | 48 | 0 | 48 | 0 | 0 |
| | TOTAL | | 95 | | 0 | 145 | 90 | 23 | | 48 | 48 | 258 | 0 | 63 |
| | | | 148 | | 48 | 120 | 100 | 0 | | 48 | 97 | | | |
| | | | | | | | | | | | 416 | | | |

FIG. 22

Finished Goods Rolling Output Report

| Planner | Device | Part No | Apr | May | Jun Plan | Jun Adj | Jun Out | Jun Var | July Plan | July Adj | July Out |
|---|---|---|---|---|---|---|---|---|---|---|---|
| Peter Sun | 9051AWLA | 61SF25616-1oT | 0 | 0 | 0 | 1500 | 1500 | -1500 | 0 | 1500 | 0 |
| Peter Sun | 9051AWLA | Subtotal | 0 | 0 | 0 | 1500 | 0 | -1500 | 0 | 1500 | 0 |
| Peter Sun | 9051BWBA | 61SP32-133TQ | 22826 | 11695 | 0 | 0 | 0 | 0 | 10000 | 10000 | 0 |
| Peter Sun | 9051BWBA | 61SP32-5TQI | 1600 | 22946 | 0 | 0 | 0 | 0 | 0 | 0 | 0 |
| Peter Sun | 9051BW | 61SP36-166TQ | 5349 | 0 | 0 | 0 | 0 | 0 | 0 | 0 | 0 |
| Peter Sun | 9051BW | Subtotal | 29775 | 34641 | 0 | 0 | 0 | 0 | 10000 | 10000 | 0 |
| Peter Sun | 9054AX | 61SF51218T-10TQ | 0 | 0 | 0 | 5000 | 1979 | -3021 | 0 | 3021 | 0 |
| Peter Sun | 9054AX | Subtotal | 0 | 0 | 0 | 5000 | 1979 | -3021 | 0 | 3021 | 0 |
| Sam Lig | 8085ST | 62LV12816-55T | 0 | 16270 | 30000 | 110000 | 2350 | -107650 | 0 | 107650 | 0 |
| Sam Lig | 8085ST | 62LV12816-55TI | 288 | 0 | 0 | 0 | 0 | 0 | 0 | 0 | 0 |
| Sam Lig | 8085ST | 62LV12816-55TIU | 0 | 0 | 10000 | 10000 | 11100 | 10000 | 10000 | 8900 | 10000 |
| Sam Lig | 8085ST | 62LV12816-70T | 0 | 0 | 0 | 3000 | 3000 | 0 | 0 | 0 | 0 |
| Sam Lig | 8085ST | 62LV12816-70TI | 4257 | 0 | 0 | 0 | 0 | 0 | 0 | 0 | 0 |
| Sam Lig | 8085ST | 62LV12816-55TI | 1717 | 0 | 0 | 0 | 0 | 0 | 0 | 0 | 0 |
| Sam Lig | 8085ST | 62LV12816-70BI | 0 | 0 | 30000 | 70000 | 79330 | 9330 | 20000 | 10670 | 24176 |
| Sam Lig | 8085ST | Available.-Die | 0 | 0 | 0 | 0 | 39136 | 39136 | 0 | -39136 | 0 |
| Sam Lig | 8085ST | Subtotal | 6262 | 16270 | 70000 | 193000 | 134916 | -58084 | 30000 | 88084 | 34176 |

FIG. 23

Work In Progress Inventory Report

Routing: ALL  Supplier: ▶  Planner: ALL
Device: ALL  Lot No: ▶  MCC: ALL ▶
Inventory Age: [  ] days or more  Search Reset  Part No: [  ]

| Lot No | Device | Part No | Routing | Type | Wafer Qty | Die Qty | Supplier | MT Area |
|---|---|---|---|---|---|---|---|---|
| JW500941 | 8075ACVB2 | 8075ACVB2 | Assembly | WH | 0 | 553 | pkgx | D-pkgx |
| JY030781 | 8075ACVB2 | 8075ACVB2 | Assembly | WH | 0 | 24086 | pkgy | D-pkgy |
| JY030801 | 8075ACVB2 | 8075ACVB2 | Assembly | WH | 0 | 25554 | pkgz | D-pkgz |
| JY030781 | 8075ACVB2 | 8075ACVB2 | Wafer Sort | WIP | 1 | 0 | testa | H-testa |
| JW500941 | 8075ACVB2 | 8075ACVB2 | Wafer Sort | WIP | 2 | 0 | testa | H-testa |
| JW500941 | 8075ACVB2 | 8075ACVB2 | Wafer Sort | WIP | 20 | 0 | testa | H-testa |
| CF727300 | 8085STLA | 8085STLA3 | Wafer Sort | WIP | 11 | 0 | testb | P-testb |
| CF855800 | 8085STLA | 8085STLA3 | Wafer Sort | WIP | 13 | 0 | testb | P-testb |
| W1509700 | 8095AWLB | 8095AWLB1 | Final Test | WH | 0 | 20080 | testc | D-testc |
| W1510200 | 8095AWLB | 8095AWLB1 | Final Test | WH | 0 | 21954 | testc | D-testc |
| W1510100 | 8095AWLB | 8095AWLB1 | Final Test | WH | 0 | 28672 | testc | D-testc |
| W1509700 | 8095AWLB | 8095AWLB1 | Final Test | WH | 0 | 32499 | testc | D-testc |

MULTI-STAGE SUPPLY CHAIN MANAGEMENT SYSTEM WITH DYNAMIC ORDER PLACEMENT

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

The present invention relates to internet commerce and particularly to methods and apparatus that enable efficient management of procurement transactions between buyers and suppliers in a supply chain that includes outsourcing with multiple suppliers.

Today, buyers and suppliers operate in a fast changing global environment where quantities needed, pricing, technical specifications and other supply parameters are frequently changing. The supply chain for procurement of goods and services requires economies of scale, market pricing and rapid delivery. The management of the process of procuring goods and services is known as "supply chain management".

Supply chain management is affected, for example, by the globalization of businesses, the proliferation of product and service variety, the increasing complexity of supply networks, and the shortening of product life cycles. Market conditions are susceptible to rapid demand fluctuation, inventory buildup, price competition, and frequent specification changes. The supply chain for any particular company may be primarily internal supply. However, outsourcing is often used as an alternative to internal supply. By way of example, outsourcing is used to reduce costs, control inventories and respond to rapid demand changes. Outsourcing increasingly is involving more and more suppliers and supply chains are growing more complex.

In fast changing markets, buyers require "current" and at times "real-time" quotes and other information from suppliers that specify, among other things, accurate quantities, prices and delivery times. The ability to rapidly exchange information among buyers and suppliers is paramount to efficient supply chain management, particularly in an outsourcing environment.

The Internet is an efficient electronic link among buyers and suppliers for exchange of supply chain information. The Internet operates with open standards and permits easy, universal and secure information exchange. Many roles exist for the Internet in commerce and some of these roles have been described as "e-business", "e-commerce", and "internet commerce". For purposes of the present specification, the term "internet commerce" (or "i-commerce") is used to represent the role of the Internet in supply chain management.

"Internet commerce" enables companies, among other things, to realize greater W: efficiency, have better asset utilization, have faster times to market, reduce order fulfillment times, enhance customer services and penetrate new markets. The Internet provides an enormous capability for distribution of "current" information that is useful and necessary for improved supply chain management. "Current" information often must be information available on a "real-time" or near "real time" basis. The Internet makes it possible to communicate "current" information about technology changes, availability of goods and services, up-to-date prices for goods and services and other information needed to manage a supply chain. When outsourcing is employed in the supply a chain, the visibility into the current status of the supply chain is more difficult and requires new and improved methods for insuring that complete, accurate and timely information is available. In the absence of such current information, the ability to react in a timely way to exceptions, abnormal events and other matters may be lost or delayed. When the time for taking action is not recognized or is delayed, supply chain management suffers and ultimately the cost of goods and services increases.

Although internet commerce simplifies many aspects of procurement, difficulties still exist and improvements are needed. One difficulty results because large numbers of suppliers and buyers are attached to the market place and each participant, whether buyer or supplier, tends to use different parameters, terminology, terms, conditions and other information unique to the particular participant. These differences among participants result in an information exchange problem.

The information exchange problem is particularly acute, for example, in the outsourcing semiconductor manufacturing industry because goods and services procured from one supplier are frequently further processed by other suppliers in subsequent downstream stages. In order to have efficient and economical supply chain management, the interrelationship among each buyer and the upstream and down stream suppliers requires an exchange of "current" information that permits real-time visibility into the status of the supply chain, fast identification of abnormal events and other information that permits exception management.

One difficulty that frustrates the good visibility necessary for supply chain management is the proliferation of different terminology and specifications used by each participant in the supply chain. While any dominating buyer (and potentially any dominating supplier) can demand conformance with its way of doing business for its own business, the semiconductor C, manufacturing industry as a whole remains widely fragmented without much progress toward standardization. Furthermore, this fragmentation is increasing rather than decreasing so that problems are bound to exist for many years to come. The fragmentation exists, of course, in many other industries.

Cooperative attempts have been made toward standardization in some industries. In the electronics component industry, the RosettaNet has the intent of providing industry wide standardization across the electronic components trading network. Some attempts have been made to standardize the semiconductor manufacturing industry. Notwithstanding these attempts, the semiconductor manufacturing industry remains fragmented and neither the RosettaNet nor any other standard has become widely adopted.

Accordingly, there is a great demand for improved supply chain management methods and apparatus that will operate efficiently in fragmented markets.

SUMMARY

The present invention is a global supply chain management system in an environment of multiple suppliers forming supply chains for one or more buyers connected over the Internet. The system includes a global processor with logic that maps "local" supply information for each buyer and each supplier, represented in one or more property tables having master information correlated to local information for each buyer and each supplier. The system manages processes from an input of lots to an output through supplier stages where clients each use fragmented different local information. A correlation means uses base lot indicators, one for each of the lots, in common for all of said stages and executes supply chain management functions for tracking lots through the supplier stages and for dynamic creation of sets of purchase orders among groups of suppliers for processing the same lot through the supply chain.

The environment is fragmented, that is, the industry as a whole has not adopted any common set of standard terminology. In a fragmented industry, each instance of local supply information for any client (buyer or supplier) can be and usually is different from the local supply information for any other client (buyer or supplier). The embodiments of the present invention map supply information from and to the master internal property information to and from fragmented output local information according to the local property correlation for each buyer and each supplier. Notwithstanding the fragmentation among buyers and suppliers, the global supply chain management system functions to implement global supply chain management using "current" supply chain information supplied over the Internet using the fragmented local supply information used by the buyer or supplier.

To insure that the supply information is accurate, the global processor executes data integrity processes to improve the reliability of the supply information. The data integrity processes include data checking and data cleansing so that mapped supply information through error detection and correction becomes more accurate than the original fragmented raw data. Data integrity processes are performed, for example, for data consistency within a record, data consistency within a report, data consistency across different reports from a particular supplier, data consistency between suppliers' and buyers' data and data consistency among suppliers.

Based upon a continuously updated data base having "current" supply information, the global processor provides reports for numerous data types including work-in-progress (WIP) reports, activity-based transaction reports (TR) that are created on a daily or other basis (including detail for each buyer and supplier stage), order reports, shipment reports and invoice reports. The terminology for the various reports and the items reported upon have no standard definitions. For example, Orders are known by different names including purchase orders (PO) that logically are for goods and work orders (WO) that logically are for services. However, common practice in many industries uses the term Purchase Order generically for any type of order whether for goods or services. These reports are all conveniently distributed over the Internet in a format and with the terminology selected by each client, whether the client is a buyer or a supplier.

With access to "current" supply information for multiple suppliers and with mapping capability among fragmented local property tables of multiple suppliers and buyers, the global processor enables the Internet placement of purchase orders and work orders (POs and WOs) that can be accompanied by detailed specifications using electronic attachments.

With access to "current" supply information for multiple suppliers and with mapping capability among fragmented local property tables of multiple suppliers and buyers, the global processor enables global planning from input to output of the supply chain. In the semiconductor manufacturing supply chain, the planning extends from Wafer (front end, upstream) planning to package/test (back end, down stream) planning.

The supply chain management system is able to provide lot tracking reports, actual cost lot detail reports, wafer rolling output reports, finished goods rolling output reports, work in progress inventory reports and other reports useful for supply chain management.

The supply chain management system employs planning based upon upstream visibility in the supply chain. Such capabilities are particularly useful in outsourcing to suppliers in a semiconductor supply chain. In the semiconductor IC-design outsourcing industry, the buyer (IC-design house) deals with multiple suppliers that provide various outsourcing functions at different supplier stages. The buyer places a separate order (Purchase Order) with each supplier. Although the Purchase Orders are separate between a buyer and each supplier, each supplier depends on the previous supplier (upstream supplier) in the supply chain.

In the semiconductor manufacturing industry in order to procure finished goods (for example a finished semicondcutor chip), a buyer first orders wafers from a Fab supplier (foundry); once the work at the Fab supplier is finished, the buyer orders sorting from a Wafer Sort supplier; after the Wafer Sort work is finished, the buyer orders Assembly from an Assembly supplier; and finally, the buyer orders Final Test from a Final Test supplier. The supply chain management system is able to perform group order generation for groups of dependent suppliers (such as Fab, Wafer Sort, Assembly and Final Test suppliers) in the supply chain.

The supply chain management system performs alert processes based upon alert conditions for specific events/reports/process of the supply chain. Alert reports are accessible to clients through i-commerce onscreen operations or through other methods of communication. Typically, alert conditions are communicated daily (or more frequently if desired) in the form of event generation and alert messages.

The input to the supply chain can take many forms and is a function of the particular industry. The input can be raw materials, groups of components or "lots" of any kind. In the semiconductor manufacturing industry, frequently "lots" are "wafer lots" or "die lots".

Lot Tracking is implemented by logic in the global processor to store detailed information related to a lot in the supply chain. The lot tracking information is categorized into two major parts, namely, static data where the data are fixed during the manufacturing processes and dynamic data where the data can be changed during the manufacturing processes. For example, the static data includes Date Code, Lot No, Order Date, Order Qty, Part No, Production Order No, PO No, Routing, Sup, and Unit Price. For example, the dynamic data includes two main parts, namely, Date Information, {Completed Date, Hold Date, Received Date, Ship Date, Start Date} and Quantity Information (Completed Qty, Downgrade Qty, Goodpart Qty, Hold Qty, Received Qty, Returned Qty, Scrappart Qty, Ship Qty, Start Qty}.

Lot tracking stores the genealogy of a lot in order to track and recall the lot history quickly. This tracking is done by storing the parent-child relationship for lots. For flexible in loading the lot tracking data, work-in-progress (WIP) reports and activity-based transaction reports (TR) are used.

Lot tracking is unique in the sense that a robust and consistent data set for the production and finance related information of a fragmented supply chain is maintained in one central place. The maintenance of such information permits performance checking, such as cycle time, yield analysis and cost reporting on a lot basis down to each stage of the supply chain.

The foregoing and other objects, features and advantages of the invention will be apparent from the following detailed description in conjunction with the drawings.

BRIEF DESCRIPTION OF THE DRAWINGS

FIG. 14 depicts one example of a lot tracking report.

FIG. 17 depicts an actual cost—lot detail report.

FIG. 19 depicts an example of Final Test purchase order.

FIG. 21 depicts an example of a wafer rolling output report.

FIG. 22 depicts an example of a finished goods rolling output report with package planning.

FIG. 23 depicts an example of a work in progress inventory report.

DETAILED DESCRIPTION

Figure 1:
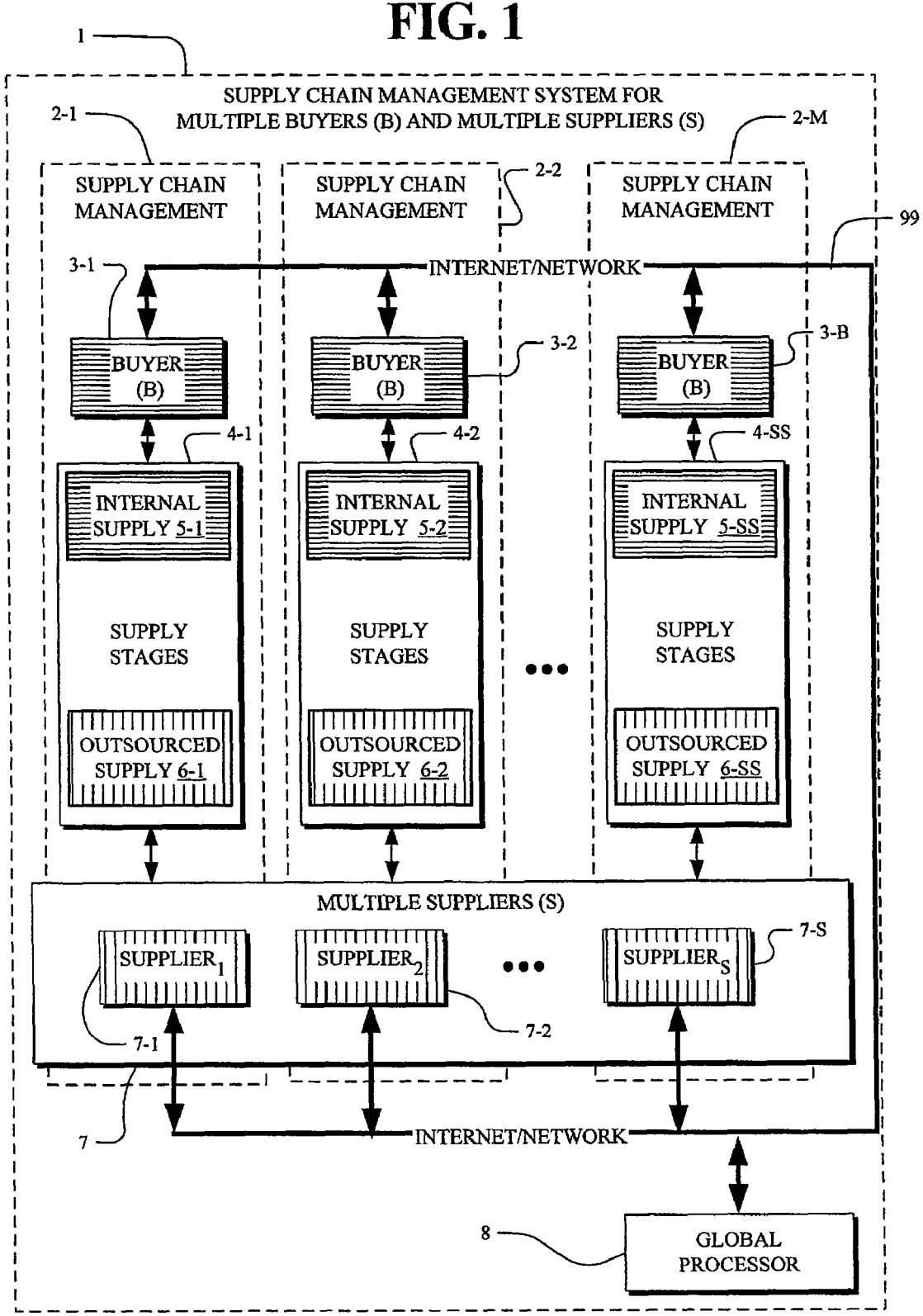
FIG. 1 depicts a plurality of supply chain management systems organized in part on an individual buyer basis and in an environment of multiple buyers and multiple suppliers forming a supply chain and depicts a global supply chain management system for the multiple buyers and multiple suppliers.

FIG. 1 depicts a plurality of supply chain management systems 2-1, 2-2, . . . , 2-M organized on an individual buyer (B) basis for the buyers 3-1, 3-2, . . . , 3-B in an environment also including multiple suppliers 7-1, 7-2, . . . , 7-S. FIG. 1 also depicts a supply chain management system 1 serving all the multiple buyers 3-1, 3-2, . . . , 3-B and multiple suppliers 7-1, 7-2, . . . , 7-S. The multiple buyers and multiple suppliers of FIG. 1 are connected over the internet and hence are able to exchange supply information rapidly and essentially in real time.

In FIG. 1, the local supply chain for each buyer includes supply stages 4 that typically include internal supply 5, that is, supply from the buyer's own organization, and outsourced supply 6, that is, supply from external suppliers 7-1, 7-2, . . . , 7-S. Specifically, the buyers 3-1, 3-2, . . . , 3-B have the supply stages 4-1, 4-2, . . . , 4-B, each in turn having the internal supply 5-1, 5-2, . . . , 5-SS and the external supply 6-1, 6-2, . . . , 6-SS, respectively.

Each of the local supply chain management systems 2-1, 2-2, . . . , 2-M are maintained, for example, by the individual buyers 3-1, 3-2, . . . , 3-B and they are typically characterized as having their own terminology, specifications and other supply chain parameters. In FIG. 1, the suppliers and buyers as a whole are widely fragmented without much standardization. FIG. 1, therefore, as it encompasses local supply chain management systems 2-1, 2-2, . . . , 2-M is representative of the semiconductor manufacturing industry.

Figure 2:
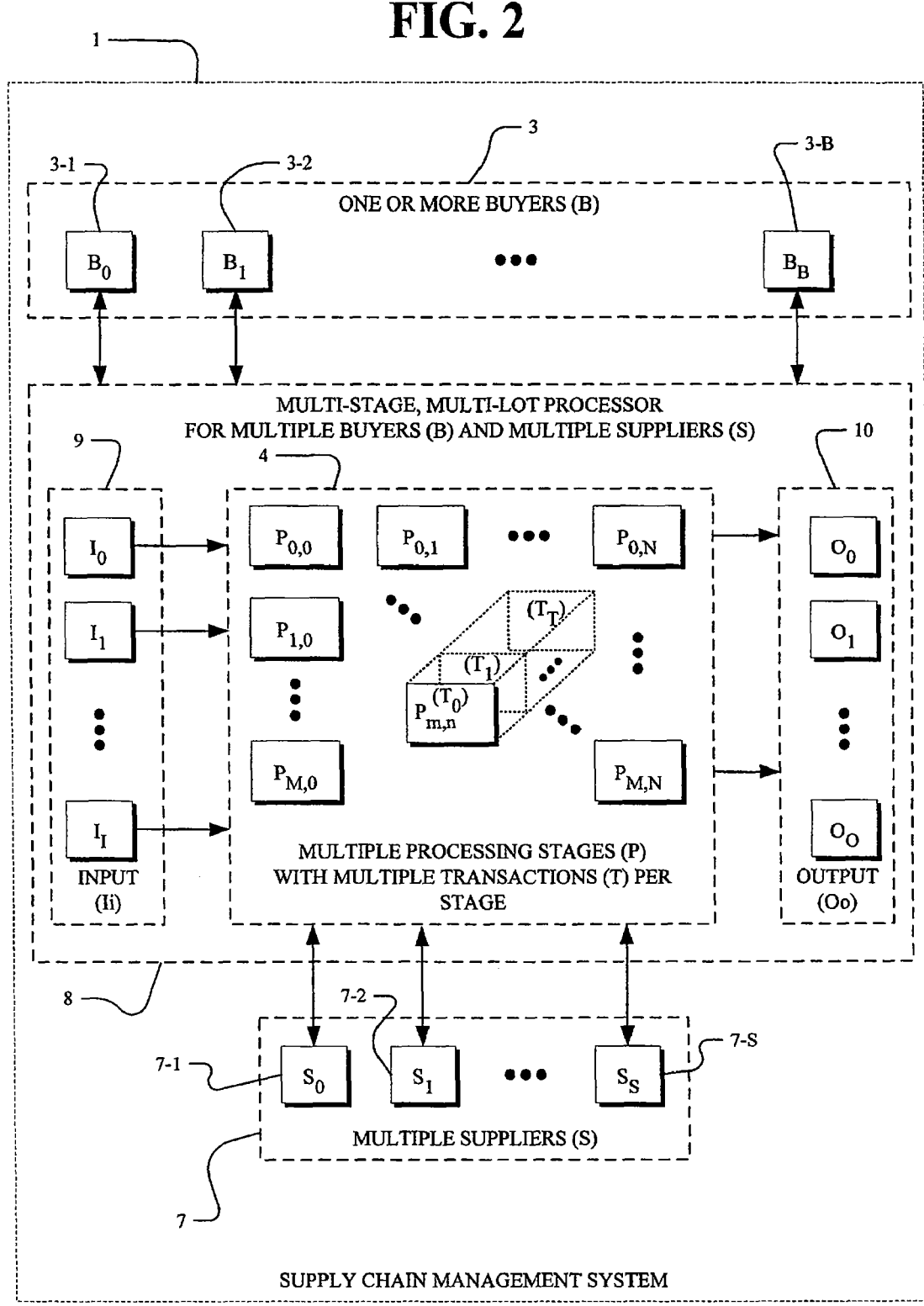
FIG. 2 depicts further details of the global supply chain management system of FIG. 1 with a multi-stage, multi-lot processor for multiple buyers and multiple suppliers.

Additionally, in FIG. 1, a global supply chain management system 1 is designed to overcome the local fragmentation and efficiently serve all the multiple buyers 3-1, 3-2, . . . , 3-B and multiple suppliers 7-1, 7-2, . . . , 7-S. The supply chain management system 1 includes a a global processor 8 that uses network communications such as the Internet for overcoming the fragmentation of local supply chain management systems 2-1, 2-2, . . . , 2-M and for providing integrated supply chain management. FIG. 2 depicts a supply chain management system operating in an environment of one or more buyers, B, including buyers $B_0, B_1, \ldots, B_B$ multiple suppliers, S, including suppliers $S_0, S_1, \ldots, S_S$ in a supply chain. The buyers and suppliers are connected to a Multi-stage, Multi-Lot Processor for Multiple Buyers (B) and Multiple Suppliers (S) where the supply chain includes inputs $I_0, I_1, \ldots, I_i, \ldots, I_I$ to the supply chain and outputs $O_0, O_1, \ldots, O_o, \ldots, O_O$ from the supply chain. The inputs are introduced to and the outputs are derived from Multiple Processing Stages (P) with Multiple Transactions (T) per Stage. The stages include $[P_{0,0}, P_{0,1}, \ldots, P_{0,N}]; [P_{1,0}, \ldots]; [\ldots, P_{m,n}, \ldots]; [P_{M,0}, \ldots, P_{M,N}]$. Each stage such as a typical stage $P_{m,n}$ includes up to T transactions such as $T_0, T_1, \ldots, T_t, T_T$.

Figure 3:
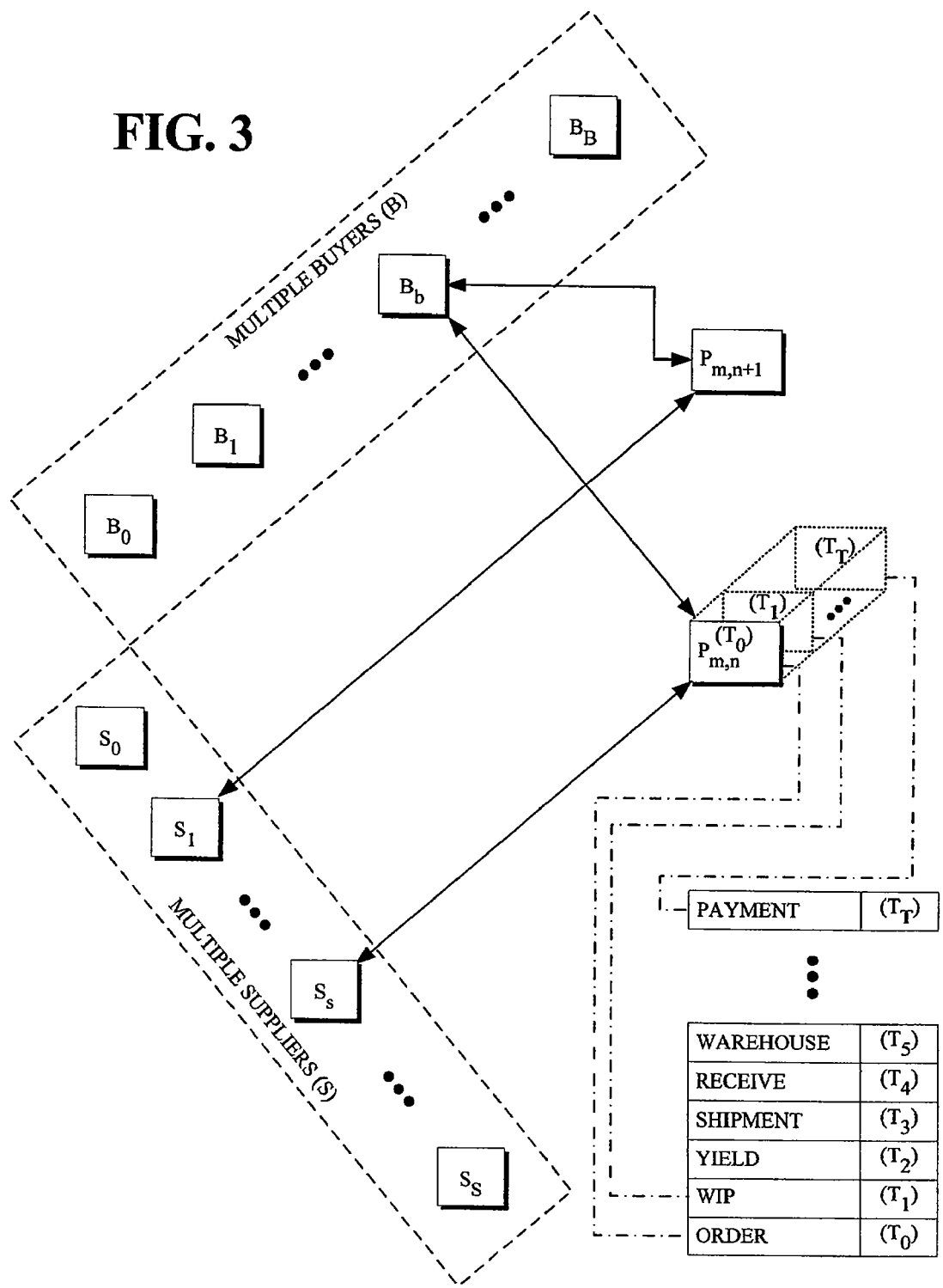
FIG. 3 depicts details of the supply chain management system of FIG. 1 and FIG. 2 with details for typical stages for processing.

FIG. 3 depicts details of the supply chain management system of FIG. 2 and details typical stages for processing. The one or more buyers, B, including $B_0, B_1, \ldots, B_b, \ldots, B_B$, and the multiple suppliers, S, including $S_0, S_1, \ldots S_s, \ldots, S_S$ are in the supply chain. Stages $P_{m,n}$ and $P_{m,n+1}$ are typical of the many stages $[P_{0,0}, P_{0,1}, \ldots, P_{0,N}]; [P_{1,0}, \ldots]; [\ldots, P_{m,n}, \ldots]; [P_{M,0}, \ldots, P_{M,N}]$ of FIG. 2. In particular, stage $P_{m,n}$ includes up to T transactions such as $T_0, T_1, \ldots, T_T$. By way of example, stage $P_{m,n}$ includes transactions $(T_0), (T_1), (T_2), (T_3), (T_4), (T_5), \ldots, (T_T)$ which are, for example, ORDER, WIP, YIELD, SHIPMENT, RECEIVE, WAREHOUSE, . . . , PAYMENT. Many other transactions are possible, of course.

In FIG. 3, the stage $P_{m,n}$ is in the supply chain with $B_b$ as the buyer and $S_s$ as the supplier. By way of another example, the stage $P_{m,n+1}$ is also in the supply chain with $B_b$ as the buyer and $S_s$ as the supplier. The stage $P_{m,n+1}$ may include the transactions $(T_0), (T_1), (T_2), (T_3), (T_4), (T_5), \ldots, (T_T)$ which are for $P_{m,n}$ ORDER, WIP, YIELD, SHIPMENT, RECEIVE, WAREHOUSE or stage $P_{m,n+1}$ may have a different set of transactions.

Figure 4:
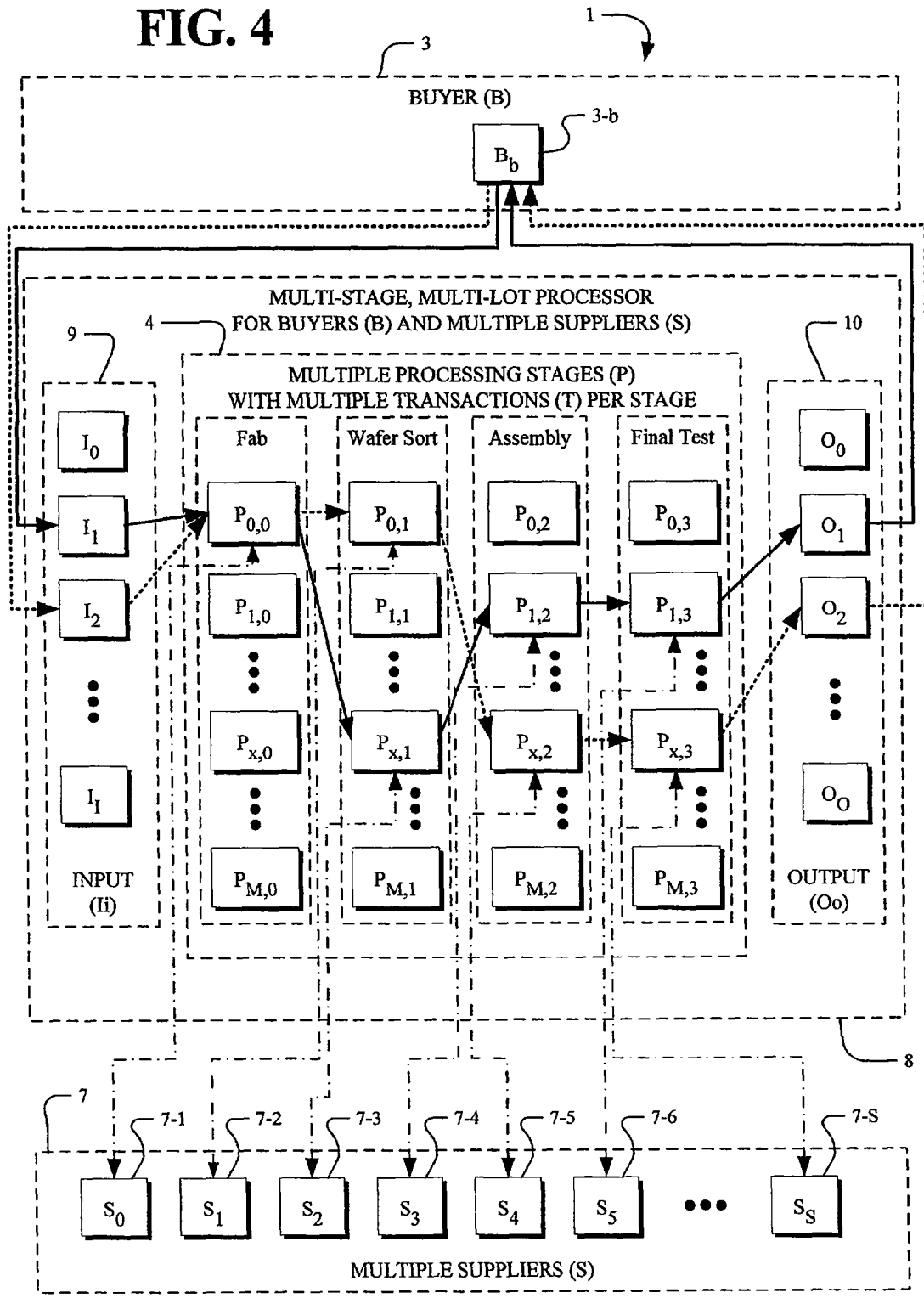
FIG. 4 depicts details of a single one of the buyers and multiple suppliers for the multistage, multi-lot processing within the supply chain management system of FIG. 1 and FIG. 2.

FIG. 4 depicts details of a single one of the buyers and multiple suppliers for the multistage, multi-lot processing within the supply chain management system of FIG. 2. FIG. 4 depicts a supply chain management system operating in an environment of one buyer, $B_b$ and multiple suppliers, S, including $S_0, S_1, S_2, S_3, S_4, S_5, \ldots, S_S$ in a supply chain. The buyers and suppliers are connected to a Multi-stage, Multi-Lot Processor for Multiple Buyers (B) and Multiple Suppliers (S) where the supply chain includes inputs $I_0, I_1, I_2, \ldots, I_I$ to the supply chain and outputs $O_1, O_1, O_2, \ldots, O_O$ from the supply chain. The inputs are introduced to and the outputs are derived from Multiple Processing Stages (P) with Multiple Transactions (T) per Stage. The stages include $[P_{0,0}, P_{0,1}, P_{0,2}, P_{0,3}]$; $[P_{1,0}, P_{1,0}, P_{1,2}, P_{1,3}]$; $\ldots$; $[P_{x,0}, P_{x,1}, P_{x,2}, P_{x,3}]$; $\ldots$; $[P_{M,0}, \ldots, P_{M,3}]$. Each of those stages includes a set of up to T transactions such as $T_0, T_1, \ldots, T_t, \ldots, T_T$ like those described in connection with FIG. 2.

In FIG. 4, buyer, $B_b$, initiates operation of the supply chain in connection with a purchase by authorizing inputs $I_1$ and $I_2$. The $I_1$ input, such as a semiconductor lot (wafer lot or die lot), to the supply chain progresses through a first sequence of stages $[P_{0,0}, P_{x,1}, P_{1,2}, P_{1,3}]$ to the output $O_1$. The supplier for the stage $P_{0,0}$ stage is $S_0$, the supplier for the stage $P_{x,1}$ stage is $S_2$, the supplier for the stage $P_{1,2}$ stage is $S_3$ and the supplier for the stages $P_{1,3}$ stage is $S_5$. Similarly, the $I_2$ input, such as a semiconductor lot, to the supply chain progresses through a second sequence of stages $[P_{0,0}, P_{0,1} P_{x,2}, P_{x,3}]$ to the output $O_2$. The supplier for the stage $P_{0,0}$ stage is $S_0$, the supplier for the stage $P_{0,1}$ stage is $S_1$, the supplier for the stage $P_{x,2}$ stage is $S_4$ and the supplier for the stages $P_{x,3}$ stage is $S_S$. FIG. 4 depicts details of a single one of the buyers and multiple suppliers for the multistage, multi-lot processing within the supply chain management system of FIG. 1.

Figure 5:
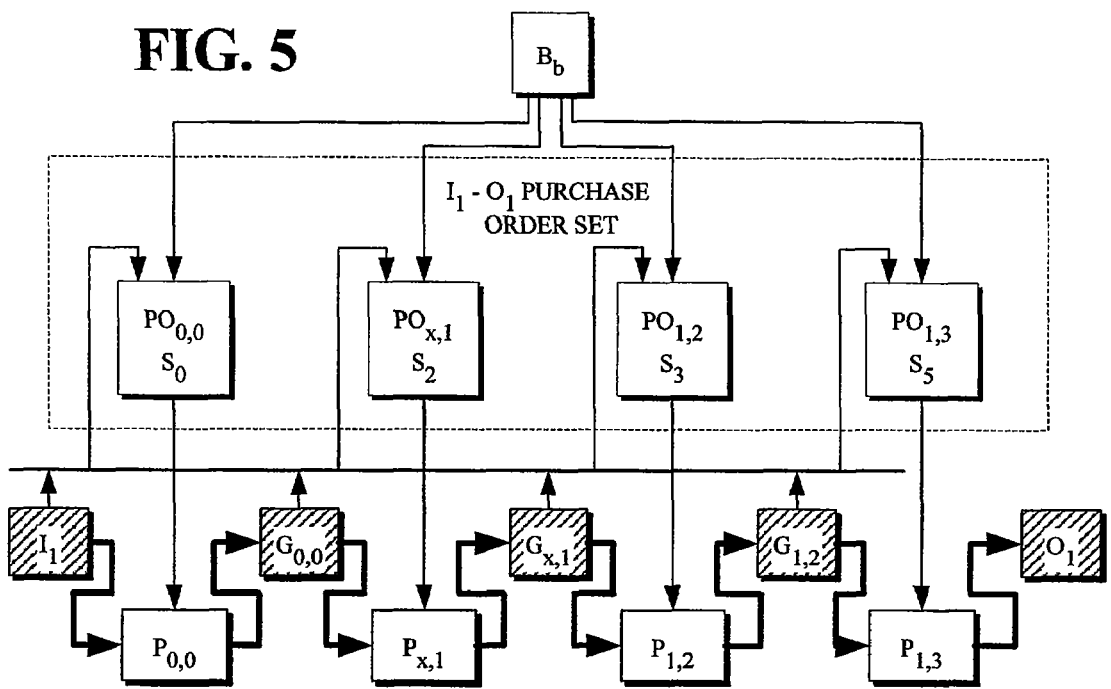
FIG. 5 depicts one example of a purchase order set for a lot in the FIG. 4 system.

FIG. 5 depicts one example of a purchase order set for multistage processing in the FIG. 4 system. In FIG. 5, buyer, $B_b$, initiates operation of the supply chain in connection with a purchase by authorizing input $I_1$. The input $I_1$ to the supply chain progresses through a sequence of stages $[P_{0,0}, P_{x,1}, P_{1,2}, P_{1,3}]$ to provide the output $O_1$. The supplier for the stage $P_{0,0}$ stage is $S_0$, the supplier for the stage $P_{x,1}$ stage is $S_2$, the supplier for the stage $P_{1,2}$ stage is $S_3$ and the supplier for the stages $P_{1,3}$ stage is $S_5$. In order for the work to be performed through the stages $[P_{0,0}, P_{x,1}, P_{1,2}, P_{1,3}]$ of FIG. 5, orders authorizing and specifying the terms and conditions associated with the work are agreed upon by the buyer, $B_b$, and the suppliers $S_0, S_2, S_3$, and $S_5$. The orders in FIG. 5 are designated $P_{0,0}S_0, P_{x,1}S_2, P_{1,2}S_3$ and $P_{1,3}S_5$. These orders are called "purchase orders" or "work orders" and apply to goods and services. In some industries, both goods and services are involved but in other industries either goods or services alone are involved.

In a semiconductor manufacturing environment, both goods and services are involved. Typically, the $I_1$ input is a lot (wafer lot or die lot) and the processing stages are typically Fab, Wafer Sort, Assembly and Final Test. Other stages are of course possible and include, for example, Packaging (such as tape and real), Bumping and Marking. The processing stages Fab, Wafer Sort, Assembly and Final Test are each performed by a supplier and typically the different suppliers $S_0, S_2, S_3$, and $S_5$. The work at each of the processing stages of Fab, Wafer Sort, Assembly and Final Test is authorized and controlled by the purchase orders $P_{0,0}S_0, P_{x,1}S_2, P_{1,2}S_3$ and $P_{1,3}S_5$, respectively. The output from the stages $[P_{0,0}, P_{x,1}, P_{1,2}, P_{1,3}]$ are represented by $[G_{0,0}, G_{x,1}, G_{1,2}, O_1]$, respectively. In FIG. 5, the set of purchase orders $[P_{0,0}S_0, P_{x,1}, S_2, P_{1,3}S_3, P_{1,3}S_5]$ relate to interdependent work steps. The output, $O_1$, is only obtained when all of the orders $[P_{0,0}S_0, P_{x,1}S_2, P_{1,2}S_3, P_{1,3}S_5]$ have been executed according to their terms and in sequence from the most upstream order $P_{0,0}S_0$ in turn through the orders $P_{x,1}S_2, P_{1,2}S_3$ to the most downstream order $P_{1,3}S_5$. Furthermore, the downstream orders depend upon the performance of the upstream orders. Typically, in the semiconductor manufacturing industry, the output at any stage is a variable, for example, varying as to supply chain parameters such as quantity, quality and delivery time. Accordingly, orders with downstream suppliers often need to be conditioned upon the results of one or more upstream suppliers.

When information in a supply chain is not accurate and "current", the entire supply chain can become inefficient, subject to distortion and unstable. One of the common distortion problems is escalating over-requirement forecasts that tend to greatly exceed market demand. Such escalation is sometimes referred to as a "bullwhip" effect. The "bullwhip" results when each supplier in the supply chain over states actual demand. The over demand escalates as forecasts are propagated downstream in the supply chain. Each downstream supplier amplifies the over-requirement of the previous stage.

In the FIG. 5 purchase order set, each of the suppliers receives "current" and accurate information from upstream suppliers through use of communications over the Internet. The "current" information helps to reduce supply chain escalation of over requirements.

Figure 6:
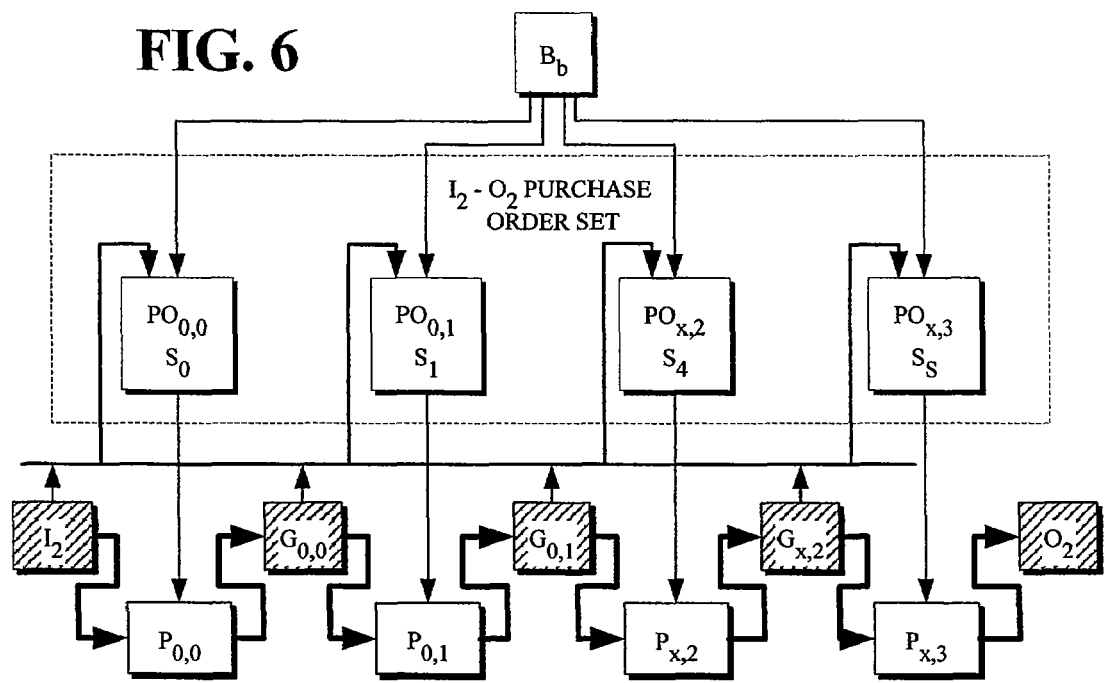
FIG. 6 depicts another example of a purchase order set for a lot in the FIG. 4 system.

FIG. 6 depicts another example of a purchase order set for multistage processing in the FIG. 4 system. In FIG. 6, buyer, $B_b$, initiates operation of the supply chain in connection with a purchase by authorizing input 12. The input 12 to the supply chain progresses through a sequence of stages $[P_{0,0}, P_{0,1}, P_{x,2}, P_{x,3}]$ to provide the output $O_2$. The supplier for the stage $P_{0,0}$ stage is $S_0$, the supplier for the stage $P_{0,1}$ stage is $S_1$, the supplier for the stage $P_{x,2}$ stage is $S_4$ and the supplier for the stages $P_{x,3}$ stage is $S_S$. In order for the work to be performed through the stages $[P_{0,0}, P_{0,1}, P_{x,2}, P_{x,3}]$ of FIG. 6, orders authorizing and specifying the terms and conditions associated with the work are agreed upon by the buyer, $B_b$, and the suppliers $S_0, S_1, S_4$, and $S_S$. The orders in FIG. 6 are designated $P_{0,0}S_0, P_{x,1}S_2, P_{1,2}S_3$ and $P_{1,3}S_5$.

In a semiconductor manufacturing environment, the $I_2$ input is a wafer lot and the processing stages are typically Fab, Wafer Sort, Assembly and Final Test each performed by a supplier and typically the different suppliers $S_0, S_1, S_4$, and $S_S$, respectively. The work at each of the processing stages of Fab, Wafer Sort, Assembly and Final Test is authorized and controlled by the orders $P_{0,0}S_0, P_{0,1}S_1, P_{x,2}S_4$ and $P_{x,3}S_S$, respectively. The output from the stages $[P_{0,0}, P_{0,1}, P_{x,2}, P_{x,3}]$ are represented by $[G_{0,0}, G_{0,1}, G_{x,2}, O_2]$, respectively. In FIG. 6, the set of purchase orders $[P_{0,0}S_0, P_{0,1}S_1, P_{x,2}S_4, P_{x,3}S_S]$ relate to interdependent work steps. The output, $O_2$, is only obtained when all of the orders $[P_{0,0}S_0, P_{0,1}S_1, P_{x,2}S_4, P_{x,3}S_S]$ have been executed according to their terms and in the sequence from the most upstream order $P_{0,0}S_0$ in turn through the orders $P_{0,1}S_1, P_{x,2}S_4$ to the most downstream order $P_{x,3}S_S$.

In the FIG. 6 purchase order set, each of the suppliers receives "current" and accurate information from upstream suppliers through use of communications over the Internet. The "current" information helps to reduce supply chain escalation of over requirements.

Figure 7:
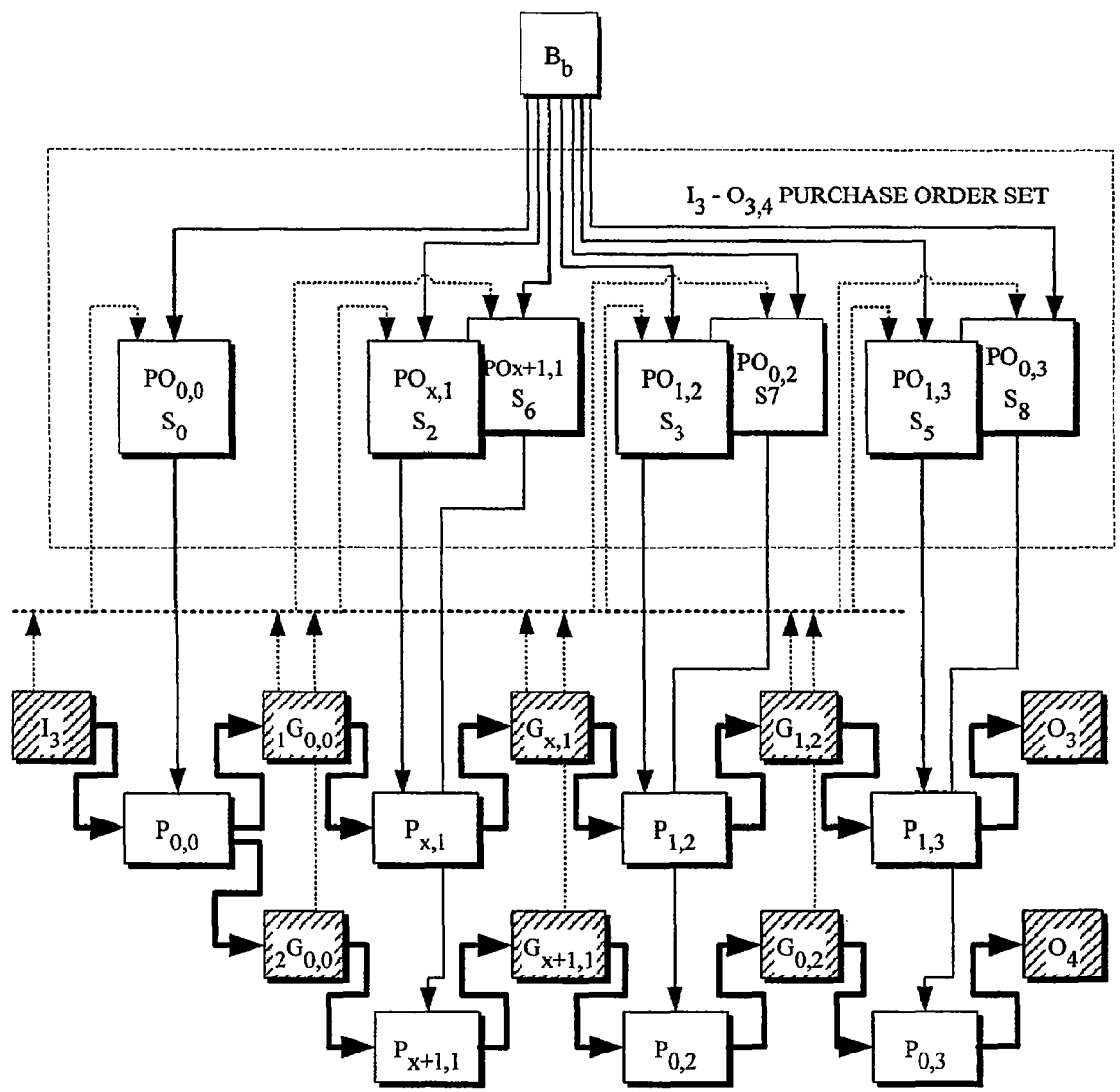
FIG. 7 depicts another example of a purchase order set for a lot in the FIG. 4 system.

FIG. 7 depicts another example of a purchase order set for multistage processing in the FIG. 4 system. In FIG. 7, buyer, $B_b$, initiates operation of the supply chain in connection with a purchase by authorizing input $I_3$. The input $I_3$ to the supply chain progresses through a sequence of stages commencing with a stage $P_{0,0}$ and thereafter split into two sequences, namely, $[P_{x,1}, P_{1,2}, P_{1,3}]$ to provide the output $O_3$ and $[P_{x+1,1}, P_{0,2}, P_{0,3}]$ to provide the output $O_4$. The supplier for the stage $P_{0,0}$ stage is $S_0$, the supplier for the stage $P_{x,1}$ stage is $S_2$, the supplier for the stage $P_{1,2}$ stage is $S_3$ and the supplier for the stages $P_{1,3}$ stage is $S_5$ and the supplier for the stage $P_{x+1,1}$ stage is $S_6$, the supplier for the stage $P_{0,2}$ stage is $S_7$ and the supplier for the stages $P_{0,3}$ stage is $S_8$. In order for the work to be performed through the stage $P_{0,0}$ an order authorizing and specifying the terms and conditions associated with the work are agreed upon by the buyer, $B_b$, and the supplier $S_0$. In order for the work to be performed through the stages $[P_{x,1}, P_{1,2}, P_{1,3}]$ of FIG. 7, orders authorizing and specifying the terms and conditions associated with the work are agreed upon by the buyer, $B_b$, and the suppliers $S_2$, $S_3$ and $S_5$. In order for the work to be performed through the stages $[P_{x+1,1}, P_{0,2}, P_{0,3}]$ of FIG. 7, orders authorizing and specifying the terms and conditions associated with the work are agreed upon by the buyer, $B_b$, and the suppliers $S_6$, $S_7$ and $S_8$. The orders in FIG. 7 are designated $[PO_{0,0}S_0]$, $[PO_{x,1}S_2, PO_{1,2}S_3, PO_{1,3}S_5]$ and $[PO_{X+1,1}S_6, PO_{0,2}S_7, PO_{0,3}S_8]$.

In a semiconductor manufacturing environment, the $I_3$ input is a wafer lot and the processing stages are typically Fab, Wafer Sort, Assembly and Final Test each performed by a supplier and typically the different suppliers $[S_0]$, $[S_2$ and $S_6]$, $[S_3$ and $S_7]$ and $[S_5$ and $S_8]$, respectively. The work at each of the processing stages of Fab, Wafer Sort, Assembly and Final Test is authorized and controlled by the orders $[PO_{0,0}S_0]$, $[PO_{x,1}S_2, PO_{1,2}S_3, PO_{1,3}S_5]$ and $[PO_{x+1,1}S_6, PO_{0,2}S_7, PO_{0,3}S_8]$. The output from the stage $P_{0,0}$ is split and is represented by $[_1G_{0,0}$ and $_2G_{0,0}]$. The outputs from the stages $[P_{x,1}, P_{x,2}, P_{x,3}]$ are represented by $[G_{x,1}, G_{1,2}, O_3]$, respectively. The outputs from the stages $[P_{x+1,1}, P_{0,2}, P_{0,3}]$ are represented by $[G_{x+1}, G_{0,2}, O_4]$, respectively.

In FIG. 7, the sets of purchase orders $[PO_{0,0}S_0]$, $[PO_{x,1}S_2, PO_{1,2}S_3, PO_{1,3}S_5]$ and $[PO_{x+1,1}S_6, PO_{0,2}S_7, PO_{0,3}S_8]$ relate to interdependent work steps. The output, $O_3$, is only obtained when all of the orders $[PO_{0,0}S_0]$ and $[PO_{x,1}S_2, PO_{1,2}S_3, PO_{1,3}S_5]$ have been executed according to their terms and in the sequence from the most upstream order to the most downstream order. The output, $O_4$, is only obtained when all of the orders $[PO_{0,0}S_0]$ and $[PO_{x+1,1}S_6, PO_{0,2}S_7, PO_{0,3}S_8]$ have been executed according to their terms and in the sequence from the most upstream order to the most downstream order. Further each of the subset order sequences $[PO_{x,1}S_2, PO_{1,2}S_3, PO_{1,3}S_5]$ and $[PO_{x+1,1}S_6, PO_{0,2}S_7, PO_{0,3}S_8]$ are interdependent in that they both drive from the parent order $[PO_{0,0}S_0]$.

In the FIG. 7 purchase order set, each of the suppliers receives "current" and accurate information from upstream suppliers through use of communications over the Internet. The "current" information helps to reduce supply chain escalation of over requirements. The FIG. 7 sequences indicate the complexity that arises among suppliers in a multistage supply chain typical of outsourcing in the semiconductor manufacturing industry when only a single buyer, $B_b$ is considered.

Figure 8:
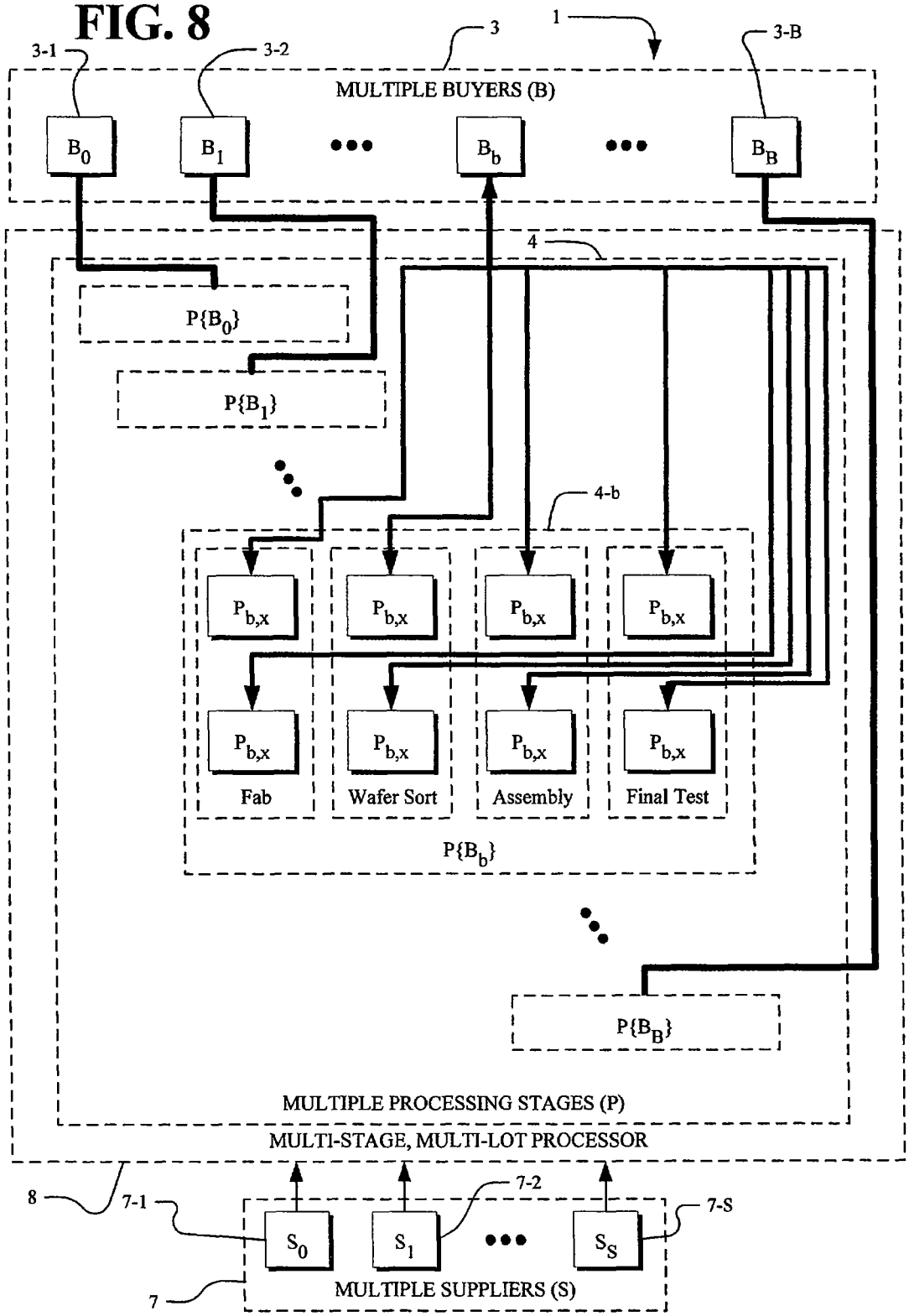
FIG. 8 depicts details of a multiple ones of the buyers and multiple suppliers for the multistage, multi-lot processing within the supply chain management system of FIG. 1.

FIG. 8 depicts a supply chain management system 1 operating in an environment of multiple buyers (B) 3 including buyers $(B_0, B_1, \ldots, B_b, \ldots, B_B)$ 3-1, 3-2, ... 3-b, ..., 3-B and multiple suppliers (S) 7 including suppliers $(S_0, S_1, \ldots, S_S)$ 7-1, 7-2, ..., 7S in a supply chain. The buyers 3 and suppliers 7 are connected to a multi-stage, multi-lot processor 8' that is one embodiment of the global processor 8 of FIG. 1. In FIG. 8, the buyer $B_b$ is typical of all the buyers $B_0$, $B_1, \ldots, B_b, \ldots, B_B$ and buyer $B_b$ places orders and receives goods and services from a multistage supply chain $P\{B_b\}$ 4-b. The multistage supply chain $P\{B_b\}$ is like any of the multistage supply chains described in connection with FIG. 1 through FIG. 7. For the semiconductor manufacturing industry, the multistage supply chain $P\{B_b\}$ includes a plurality of stages $P_{bx}$ organized functionally, for example, into Fab, Wafer Sort, Assembly and Final Test stages. The stages $P_{bx}$ are like any of the stages described in connection with FIG. 1 through FIG. 7. The single buyer $B_b$ is typical and more generally all the buyers $B_0, B_1, \ldots, B_b, \ldots, B_B$ are associated with multistage supply chains $P\{B_0\}$, $P\{B_1\}$, ..., $P\{B_b\}$, ..., $P\{B_B\}$, respectively. The stages $P_{bx}$ for any particular one of the supply chains $P\{B_0\}$, $P\{B_1\}$, ..., $P\{B_b\}, \ldots, P\{B_B\}$ may be same as or different from the stages $P_{bx}$ for any other ones of the supply chains $P\{B_0\}$, $P\{B_1\}, \ldots, P\{B_b\}, \ldots, P\{B_B\}$. FIG. 8 indicates the great complexity of the supply chain environment for multiple buyers and multiple suppliers common in many industries such as the semiconductor manufacturing industry.

Figure 9:
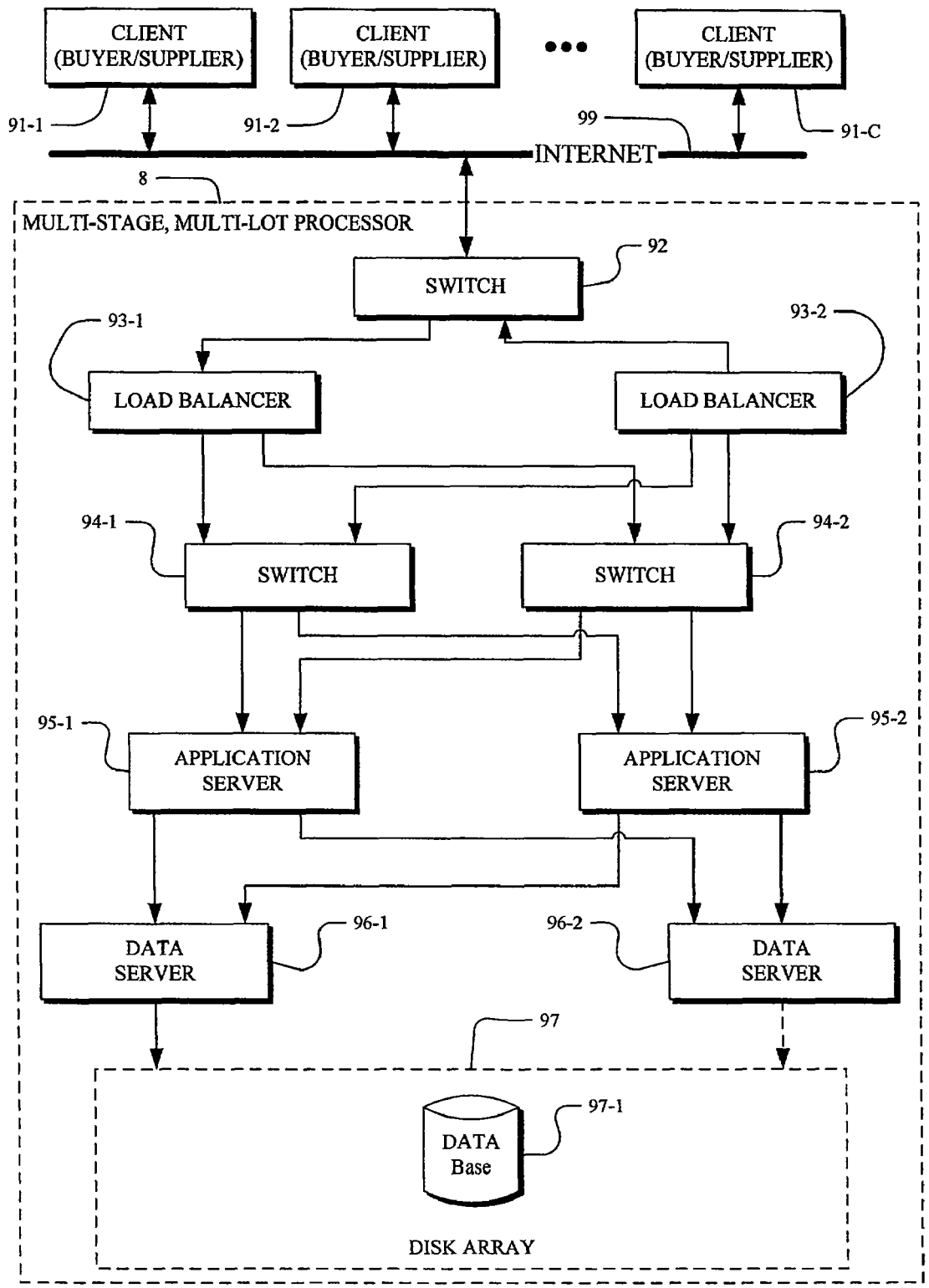
FIG. 9 depicts a hardware block diagram of a computer system network for the supply chain management system of FIG. 1.

FIG. 9 depicts a hardware block diagram of a computer system network for the supply chain management system of FIG. 1. In FIG. 9, the CLIENT(BUYER/SUPPLIER) 91-1, the CLIENT(BUYER/SUPPLIER) 91-2 and the CLIENT (BUYER/SUPPLIER) 91-C connect over INTERNET 99 to MULTI-STAGE, MULTI-LOT PROCESSOR 8 and particularly to the SWITCH 92. The SWITCH 92 functions to switch incoming and outgoing traffic between the LOAD BALANCER 93-1 and the LOAD BALANCER 93-2. The LOAD BALANCER 93-1 and the LOAD BALANCER 93-2 connect between the SWITCH 94-1 and the SWITCH 94-2. The SWITCH 94-1 and the SWITCH 94-2 connect to the APPLICATION SERVER 95-1 and the APPLICATION SERVER 95-2. The APPLICATION SERVER 95-1 and the APPLICATION SERVER 95-2 execute programs for performing supply chain management in the multiple buyer, multiple supplier environment. The APPLICATION SERVER 95-1 and the APPLICATION SERVER 95-2 connect through DATA SERVER 96-1 and DATA SERVER 96-2 to the DISK ARRAY 97 which includes the disks MAIL 97-1, DATABASE 97-2 and LOG-IN 97-3. The processor 8 of FIG. 9 includes two-way redundancy for providing highly reliable and highly available supply chain management services to the buyers and suppliers that are the clients in the network.

Figure 10:
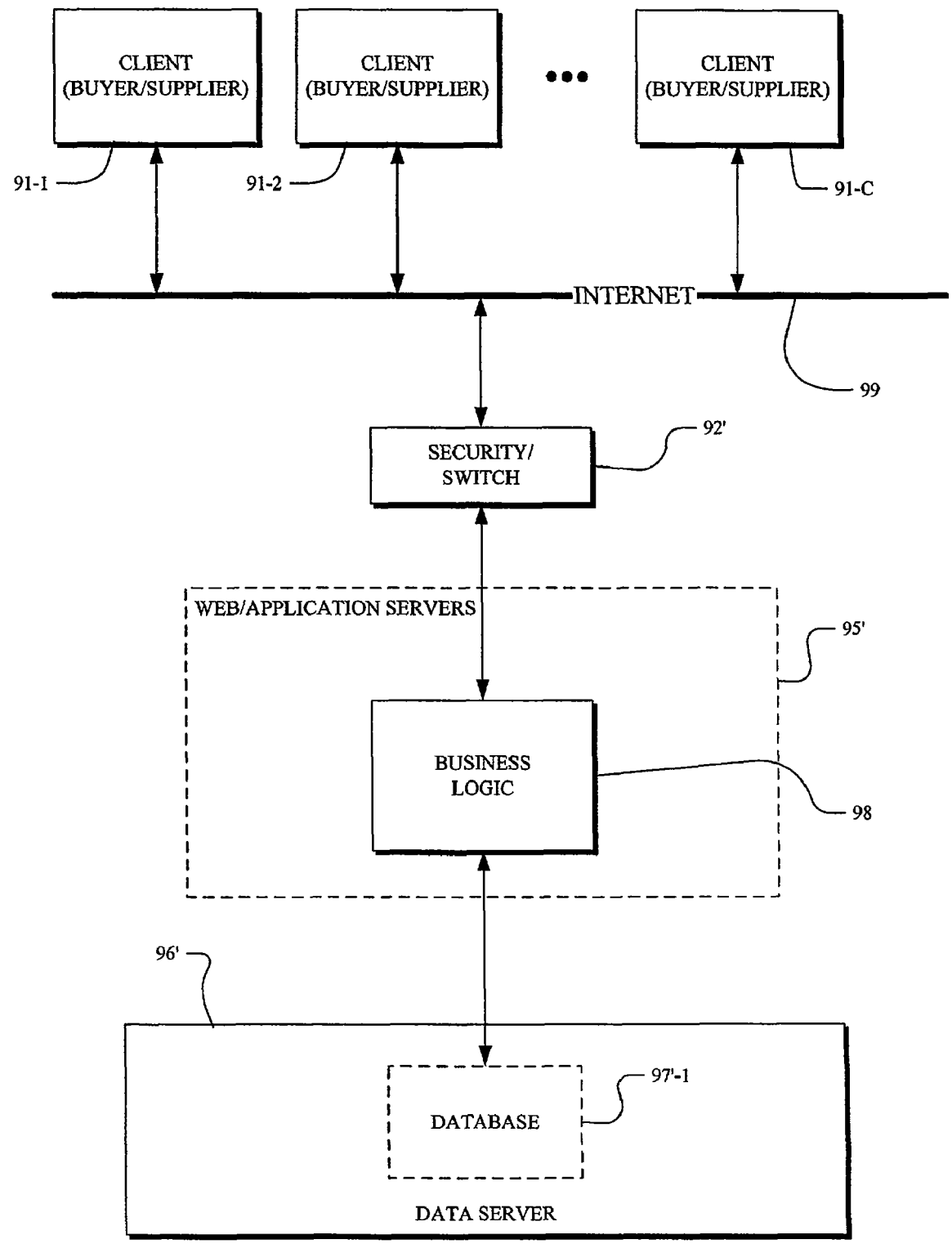
FIG. 10 depicts a software block diagram for the supply chain management system of FIG. 1.

FIG. 10 depicts a software block diagram for the supply chain management system of FIG. 1. In FIG. 9, the CLIENT (BUYER/SUPPLIER) 91-1, the CLIENT (BUYER/SUPPLIER) 91-2 and the CLIENT (BUYER/SUPPLIER) 91-C connect over INTERNET 99 to MULTI-STAGE, MULTI-LOT PROCESSOR 8 and particularly to the SECURITY/ SWITCH 92'. The SECURITY/SWITCH 92' functions to perform security checks on the internet traffic and to switch incoming and outgoing traffic between the WEB 98-1 and the BUSINESS LOGIC 98-2 executing in the PROCESS SERVERS 95'. The WEB 98-1 and the BUSINESS LOGIC 98-2 and the APPLICATION SERVER 95-2 connect to the DATA SERVER 97' which includes MAIL 97'-1, DATABASE 97'-2 and LOG-IN 97'-3 functions. The WEB 98-1 process functions are primarily for real-time interactive communications between the DATA SERVER 97' and CLIENTs 91-1, 91-2, ..., 91-C. The BUSINESS LOGIC 98-2 is primarily for performing the operations necessary for supply chain management services in the multiple buyer, multiple supplier environment. The BUSINESS LOGIC 98-2 is logic means for accessing master information for executing supply chain management functions for the clients to provide management data.

Figure 11:
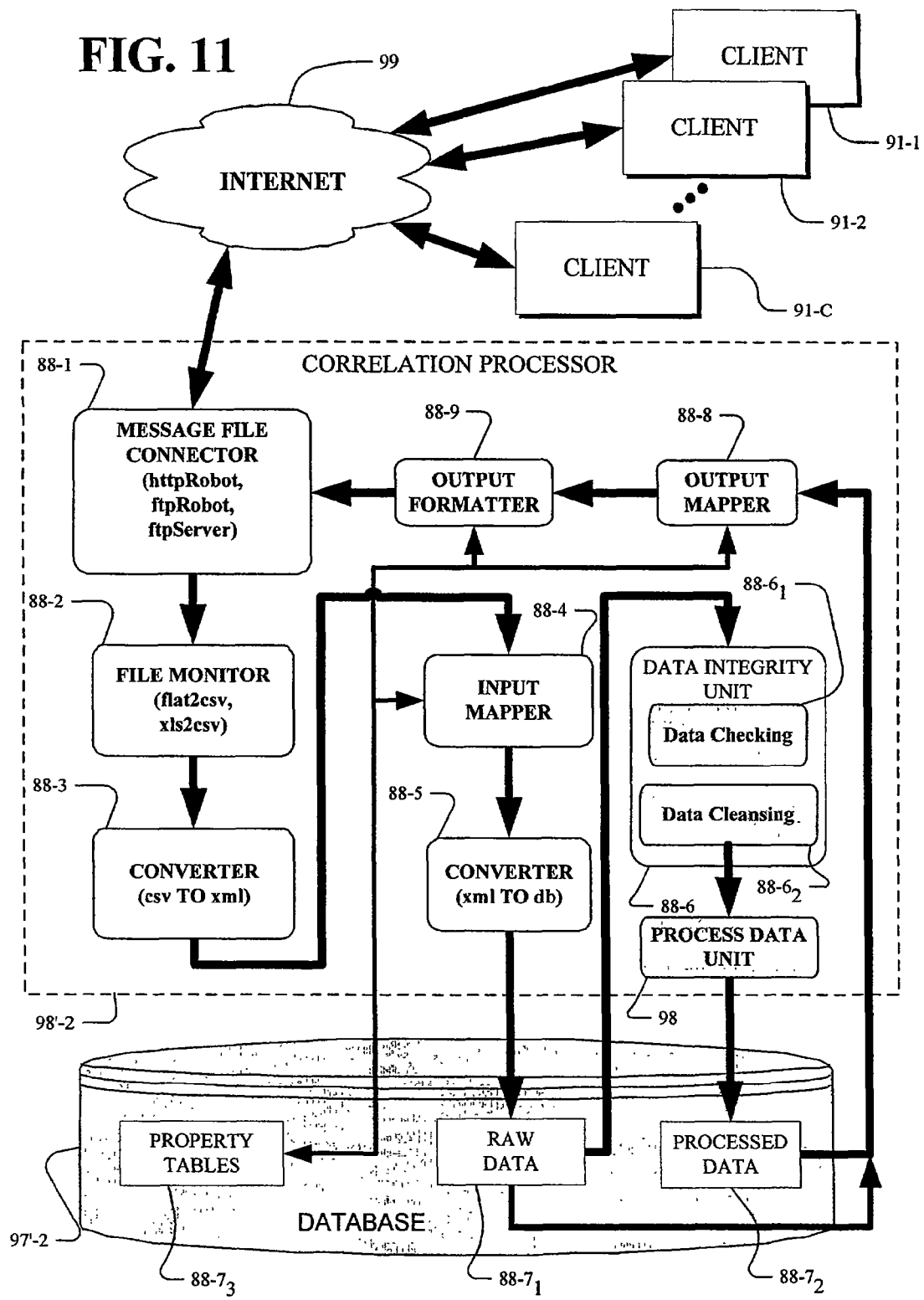
FIG. 11 depicts a correlation processor for correlating input and output information among clients including mapping and data integrity processing in the FIG. 9 and FIG. 10 systems for supply chain management.

FIG. 11 depicts a CORRELATION PROCESSOR 98'-2 for correlating input and output information among clients. The correlation is among the local and fragmented information that is different for each client. In the particular embodiment of FIG. 11, the CORRELATION PROCESSOR 98'-2 performs mapping and data integrity processing in connection with the supply chain management. In FIG. 11, the CLIENTs 91-1, 91-2, ..., 91-C connect over INTERNET 99 to the CORRELATION PROCESSOR 98'-2. The CORRELATION PROCESSOR 98'-2 is part of the BUSINESS LOGIC 98-2 of FIG. 10. The MESSAGE FILE CONNECTOR 88-1 functions using conventional internet protocols (httpRobot, ftpRobot, ftpServer) for incoming and outgoing communications over the INTERNET 99. The FILE MONITOR 88-2 detects the file format and makes conventional conversion to comma separated values (for example, flat2csv, xls2csv). The CONVERTER 88-3 converts the csv values to an xml format as an input to the INPUT MAPPER 88-4. The INPUT MAPPER 88-4 functions to map the local property values inherent in the input data to master property values defined by the supply chain management system. The INPUT MAPPER 88-4 accesses the PROPERTY TABLES in the DATABASE 97'-2 to do the mapping. After mapping, the mapped raw input data is converted in CONVERTER 88-5 from an xml format to a database format (xml TO db) and stored in the RAW DATA store $88-7_1$. The mapped raw input data is then processed in the DATA INTEGRITY UNIT 88-6 including the Data Checking unit $88-6_1$ and the Data Cleansing $88-6_2$. The checked and cleaned processed input data is stored The checked and cleaned raw data is processed in the PROCESS DATA UNIT 98 and the processed data is stored in the PROCESSED DATA store $88-7_2$. Any of the raw data in the RAW DATA store $88-7_1$ or the processed data in the PROCESSED DATA store $88-7_2$ can be communicated to the CLIENTs 91-1, 91-2 and 91-C using the OUTPUT MAPPER 88-8 to map the output data to the form expected by the client. The OUTPUT MAPPER 88-8 functions to map the master property information defined by the supply chain management system to the local property information of the type and form used by clients as revealed in the input data from clients. The OUTPUT MAPPER 88-8 is an output mapping means for mapping management data to local data for clients. The OUTPUT MAPPER 88-8 accesses the PROPERTY TABLES in the DATABASE 97'-2 to do the mapping.

Different buyers, such as Fabless semiconductor companies, frequently require different information from their suppliers' daily or other reports. Often suppliers can provide only one format for these reports to all of their buyers due to the constraints in their computer systems. To bridge this information gap, the supply chain management system uses a database schema which provides a master property table holding a super set of information for all the clients (buyers and suppliers) using the system. When the buyers and suppliers send their records, reports and inquiries to the supply chain management system, the data are mapped into the master database schema.

A client-specific property file is created to describe the client-specific ("local") data for each client. In one embodiment, MicroSoft BizTalk is used to generate a schema.biz and mapper.biz to define the mapping between a client's local data and the master database schema. Then, a JAVA class, CSV2XML, is applied to convert these data reports from .DBF, .XLS or .CSV format into XML format files based on the description in the corresponding local property files. The XML style sheet file, .XSL, generated by the mapper.biz and the JAVA class, XML2 DB, are used to convert the report data into the final format to be imported into the master table of the database.

The master table can be in any form including indexed files, linked sub-tables, linked lists, among others. The following TABLE 1 is an example of a master property table where the column "Field Name" represents the master table name and the column "Description" briefly describes the general use of the Field Name. TABLE 1 is representative of a master table and is not intended to be exhaustive. Other fields are added as the need arises.

TABLE 1

Copyright 2002 GetSilicon, Inc.

| | Field Name | Description |
|---|---|---|
| 1 | Actual Charge | Charge for Units actually delivered as Final Product |
| 2 | Actual Qty | Quantity of Units actually delivered as Final Product |
| 3 | Back Issue Die Qty | Back Issued Die Qty |
| 4 | Base Lot | Indicator number derived from the lot genealogy specification |
| 5 | Bin | Physical bin location |
| 6 | Completed Date | Date on which the manufacturing process completes |
| 7 | Completed Die Qty | Number of dies completed in the processing |
| 8 | Completed Qty | Number of Units completed in the processing |
| 9 | Completed Wafer Qty | Number of wafers completed in the processing |
| 10 | Date Code | Code to designate the manufacturing date of product |
| 11 | Description | Description of process parameters |
| 12 | Device Type | Type of device |
| 13 | Down Grade Qty | Number of Units being downgraded to lower specs after production |
| 14 | Est Amount | Estimated finished goods amount |
| 15 | Est_FG_Date | Estimated finished goods date |
| 16 | Est_FG_Qty | Estimated finished goods quantity |
| 17 | Estimate Complete Date | Revised completion date based on the current process information |
| 18 | ETA Date | Date of estimated time of arrival |
| 19 | Good Unit Qty | Number of good Units |
| 20 | Gross Ship Weight | Gross weight as shipped |
| 21 | Hold Date | Date Hold starts |
| 22 | Hold Qty | Number of Units on hold |
| 23 | I_No | Identification number for product |
| 24 | Invoice Date | Invoice created date |
| 25 | Invoice No | Invoice number |
| 26 | Lot No | Number for Client derived from Base Lot indicator |
| 27 | Net Shipping Weight | Net weight as shipped |
| 28 | Notes | Special instructions and details |
| 29 | Order Confirm Date | Date order confirmed |
| 30 | Order Date | Date on which the production order is issued |
| 31 | Order Qty | Quantity ordered |

TABLE 1-continued

Copyright 2002 GetSilicon, Inc.

| Field Name | Description |
| --- | --- |
| 32 Order Req Date | Date order requested |
| 33 Ordered Die Qty | Ordered die qty |
| 34 Ordered Wafer Qty | Ordered wafer qty |
| 35 Part No | Part number |
| 36 PO No | Purchase Order number |
| 37 PO Rev No | Revolution of PO No |
| 38 Process | Name of detailed process used by Supplier |
| 39 Production Order No | Number for production order |
| 40 Received Date | Date on which Units are received |
| 41 Received Die Qty | Number of die received for the manufacturing process |
| 42 Received Qty | Number of Units received |
| 43 Received Wafer Qty | Number of wafer received for the manufacturing process |
| 44 Return Code | Code used to make a return |
| 45 Return Order No | Number used to make a return |
| 45 Return Qty | Number of Units returned |
| 46 Routing | Name of stage, such as Fab, Wafer Sort, Assembly, Final Test |
| 47 Routing Status | Status such as scheduled, started, active, hold, completed or shipped |
| 48 Scrap Qty | Number of Units being scraped |
| 49 Return Qty | Number of Units being returned |
| 50 Ship Cost | Shipping cost |
| 51 Ship Date | Date of current shipment |
| 52 Ship Qty | Unit quantity in the current shipment |
| 53 Ship Dimension | Dimension of packed shipment |
| 54 Ship Line No | Number on shipping package |
| 55 Ship To | Destination client |
| 56 Ship Via | Carrier name |
| 57 Shipping Notice No | Number on shipping package |
| 58 Start Date | Date on which the processing begins |
| 59 Start Qty | Number of Units when the processing starts |
| 60 Sup | Supplier name |
| 61 Topmark | Topmark visible on top of finished goods |
| 62 Unit | Unit type such as Wafer, Die |
| 63 Unit Price | Unit price per Unit |
| 64 Weighted Completed Date | Weighted completed date, based on the quantity |
| 65 Weighted Received Date | Weighted received date, based on the quantity |
| 66 Weighted Ship Date | Weighted ship date, based on the quantity |
| 67 Weighted Start Date | Weighted start date, based on the quantity |
| 68 WIP Die Qty | Number of dies that is active in the production process |
| 69 WIP Wafer Qty | Number of wafers that is active in the production process |
| 70 WO No | Work Order No |
| 71 WO Rev No | Work Order Rev |
| 72 Yield | Output over input (in percent) |

The following TABLE 2, TABLE 3 and TABLE 4 are examples of the master property table and the corresponding local client information mapping. In TABLE 2, the column H "Field Name" represents the master table information, the column "Buyer1" represents a buyer client local client information of a buyer and the columns "Fab1", "Wafer Sort1", "Assembly1" and "Test1" represent local client information of four suppliers representing different stages of semiconductor manufacturing.

In TABLE 3, the column "Field Name" represents the master table information, the column "Buyer1" represents local client information of a buyer and the columns "Wafer Sort1" and "Wafer Sort2" represent local client information of two suppliers representing the same Wafer Sort stage of semiconductor manufacturing.

In TABLE 4, the column "Field Name" represents the master table information, the column "Buyer1" represents a buyer client local client information of a buyer and the columns "Assembly1", "Assembly2" and "Assembly3" represent local client information of two suppliers representing the same Assembly stage of semiconductor manufacturing. Certain ones of the fields in TABLE 1 derive directly from client fields while others are derived as a result of processing.

Examples of derived fields include:
1) Base Lot. A derived number indicator used for tracking the lot genealogy for a buyer through all suppliers.
2) In-Date. A derived date that is the earliest date associated with any transaction at a client, for example, the earlier of the Received Date and the Start Date.
3) Out-Date. The latest date associated with any transaction at a client, for example, the later of the Complete Date and the Ship Date.
4) The term Qty generally means quantities that have been accumulated to show totals for one or more transactions or parts of a transaction.
5) The term Weighted refers to dates weighted by quantity. For example, for 100 pcs received on Jun. 5, 2002 0:0:0 and 200 pcs received on Jun. 6, 2002 0:0:0, the Weighed Received Date is: (date1*qty1+date2*qty2)/(qty1+qty2), the Weighted Received Date is: Jun. 5, 2002 18:0:0.
6) Est_FG_Date. The estimated finished good date, the date which the current material will be available as finished goods. The Est_FG_Date is calculated based on the standard cycle time of each stage (routing).
7) Est_FG_Qty. The estimated finish good quantity, the expected quantity which the current material becomes the final finish goods. The Est_FG_Qty is calculated based on the expected Yield of each stage.
8) Yield. Determined as the ratio Output Qty/Input Qty.

The derived fields are only by way of example as any number of additional derived fields may be added as the need arises.

TABLE 2

| # | Field Name | Buyer1 | Fab1 | Wafer Sort1 | Assembly1 | Test1 |
|---|---|---|---|---|---|---|
| 1 | Shipping Notice No | PackageNO | Invoice Number | Reference_No | Packing No | Reference No |
| 2 | PO No | | Customer PO | | | |
| 3 | PO Rev No | | | | | |
| 4 | WO No | Work Order No | | Work Order No | WO Number | Po No |
| 5 | WO Rev No | Work Order Rev | | | | |
| 6 | Order Line No | | | | Order Line No | |
| 7 | Device Type | Device | | | | |
| 8 | Part No | Part Num | | Part No. | Part Num | Part No |
| 9 | I_No | I_No | Customer Device | | | Product No |
| 10 | Bin | BIN | | | | BIN |
| 11 | Lot No | CM Lot No | Fab1 Lot ID | Lot No. | Lot No | Lot No |
| 12 | Description | | | | | |
| 13 | Order Date | | | | | |
| 14 | Order Qty | | | | | |
| 15 | Order Req Date | | | | | |
| 16 | Order Confirm Date | | | | | |
| 17 | UM | | | | | |
| 18 | Ship Line No | Package NO | | | Item | N |
| 19 | Ship Date | PACKAGE Date | | Date | Date | Date |
| 20 | ETA Date | | | | | |
| 21 | Ship Wafer Qty | Qty | Ship Qty | Wafer Shipping QTY | QTY | Qty1 |
| 22 | Ship Die Qty | | | Good Die Qty | QTY | Qty2 |
| 23 | Ship To | | Ship To | | Ship to Location | To |
| 24 | Ship Via | | | | VIA | via |
| 25 | Gross Ship Weight | | | | G.W | |
| 26 | Net Shipping Weight | | | | N.W | |
| 27 | Ship Dimension | | | | Dimension | |
| 28 | Ship Cost | | | | | |
| 29 | Invoice Date | invoice created date | | invoice date | inv date | |
| 30 | Invoice No | Invoice No | Invoice No | Invoice No | Invoice No | Invoice No |
| 31 | Notes | | | | | |
| 32 | Date code | | | Date Code | | |
| 33 | Return Order No | | | | | |
| 34 | Return Code | | | | | |

TABLE 3

| # | Field Name | Buyer1 | Wafer Sort1 | Wafer Sort2 |
|---|---|---|---|---|
| 1 | Shipping Notice No | Package NO | Reference_No | F_SHIP_NO |
| 2 | PO No | | | |
| 3 | PO Rev No | | | |
| 4 | WO No | Work Order No | Work Order No | F_RELEASE_NO |
| 5 | WO Rev No | Work Order Rev | | |
| 6 | Order Line No | | | F_RELEASE_NO |
| 7 | Device Type | Device | Wafer | |
| 8 | Part No | Part Num | Part No. | F_CUST_PN |
| 9 | I_No | I_NO | | |
| 10 | Bin | BIN | | |
| 11 | Lot No | CM Lot No | Lot No. | F_CUST_LOT_NO |
| 12 | Description | | | |
| 13 | Order Date | | | |
| 14 | Order Qty | | | |
| 15 | Order Req Date | | | |
| 16 | Order Confirm Date | | | |
| 17 | Unit | | | |
| 18 | Ship Line No | Package NO | | |
| 19 | Ship Date | PACKAGE Date | Date | F_MODIFY_DATE |
| 20 | ETA Date | | | |
| 21 | Ship Wafer Qty | Qty | Wafer Shipping QTY | F_PIECES |
| 22 | Ship Die Qty | | Good Die Qty | F_GOOD_DIES |
| 23 | Ship To | | | F_SHIP_TO |
| 24 | Ship Via | | | |
| 25 | Gross Ship Weight | | | |
| 26 | Net Shipping Weight | | | |
| 27 | Ship Dimension | | | |

TABLE 3-continued

| # | Field Name | Buyer1 | Wafer Sort1 | Wafer Sort2 |
|---|---|---|---|---|
| 28 | Ship Cost | | | |
| 29 | Invoice Date | invoice created date | | |
| 30 | Invoice No | Invoice No | Invoice No | Invoice No |
| 31 | Notes | | | |
| 32 | Date code | | | |
| 33 | Return Order No | | | |
| 34 | Return Code | | | |

TABLE 4

| # | Field Name | Assembly1 | Assembly2 | Assembly3 |
|---|---|---|---|---|
| 1 | Shipping Notice No | Package NO | Packing No | SHIPMENT NO |
| 2 | PO No | | | |
| 3 | PO Rev No | | | |
| 4 | WO No | WO Num | WO Number | P.O.NUM |
| 5 | WO Rev No | WO Rev Num | | |
| 6 | Order Line No | | Order Line No | |
| 7 | Device Type | Device Type | Device | DEVICE |
| 8 | Part No | Part No | Part Num | |
| 9 | I_No | | | |
| 10 | Bin | | | |
| 11 | Lot No | Lot No | Lot No | LOT NUM |
| 12 | Description | | | |
| 13 | Order Date | | | |
| 14 | Order Qty | | | Qty |
| 15 | Order Req Date | | | |
| 16 | Order Confirm Date | | | |
| 17 | Unit | | | |
| 18 | Ship Line No | | Item | |
| 19 | Ship Date | ETA | Date | ETD |
| 20 | ETA Date | ETD | | ETA |
| 21 | Ship Wafer Qty | | QTY | |
| 22 | Ship Die Qty | QTY | QTY | |
| 23 | Ship To | Ship to Loc | Ship to Location | |
| 24 | Ship Via | VIA | VIA | FORWARDER |
| 25 | Gross Ship Weight | G.W | G.W | WEIGHT |
| 26 | Net Shipping Weight | N.W | N.W | |
| 27 | Ship Dimension | | Dimension | |
| 28 | Ship Cost | | | |
| 29 | Invoice Date | | | |
| 30 | Invoice No | Invoice Date | invoice date | |
| 31 | Notes | Invoice No | Invoice No | Invoice No |
| 32 | Date code | | | |
| 33 | Return Order No | | | |
| 34 | Return Code | | | |

One program for implementing the mapping described is presented in the following TABLE 5.

TABLE 5

Copyright 2002 GetSilicon, Inc.

```
1  <xsl:stylesheet xmlns:xsl='http://www.w3.org/1999/XSL/Transform' xmlns:msxsl='urn:schemas-microsoft-com:xslt'
2  xmlns:var='urn:var' xmlns:user='urn:user' exclude-result-prefixes='msxsl var user' version='1.0'>
3  <xsl:output method='xml' encoding='UTF-8' indent='yes' omit-xml-declaration='yes' />
4  <xsl:template match='/'>
5    <xsl:apply-templates select='INSERT'/>
6  </xsl:template>
7  <xsl:template match='INSERT'>
8  <INSERT>
9    <xsl:for-each select='ROWSET_shipHEADER'>
10     <ROWSET_SHIPHEADER>
11       <xsl:for-each select='ROW_shipHEADER'>
12         <ROW_SHIPHEADER>
13           <!-- Connection from source node "ToID" to destination node "BUYER" -->
14           <BUYER><xsl:value-of select='ToID/text( )'/></BUYER>
15           <!-- Connection from source node "FromID" to destination node "SUPPLIER" -->
16           <SUPPLIER><xsl:value-of select='FromID/text( )'/></SUPPLIER>
17           <!-- Connection from source node "reportDate" to destination node "REPORTDATE" -->
18           <REPORTDATE><xsl:value-of select='reportDate/text( )'/></REPORTDATE>
19           <!-- Connection from source node "tDate" to destination node "TDATE" -->
```

TABLE 5-continued

Copyright 2002 GetSilicon, Inc.

```
20        <TDATE><xsl:value-of select='tDate/text( )'/></TDATE>
21        <!-- Connection from source node "fileName" to destination node "FILENAME" -->
22        <FILENAME><xsl:value-of select='fileName/text( )'/></FILENAME>
23        <!-- Connection from source node "fileSize" to destination node "FILESIZE" -->
24        <FILESIZE><xsl:value-of select='fileSize/text( )'/></FILESIZE>
25        <!-- Connection from source node "RecordSize" to destination node "RECORDSIZE" -->
26        <RECORDSIZE><xsl:value-of select='ancestor::*[2]/RecordSize/text( )'/></RECORDSIZE>
27      <!-- Connection from source node "ROW_shipHEADER" to destination node "ROW_SHIPHEADER" -->
28      <xsl:value-of select='./text( )'/>
29      </ROW_SHIPHEADER>
30    </xsl:for-each>
31    <!-- Connection from source node "ROWSET_shipHEADER" to destination node "ROWSET_SHIPHEADER" -->
32    <xsl:value-of select='./text( )'/>
33    </ROWSET_SHIPHEADER>
34  </xsl:for-each>
35  <xsl:for-each select='shipITEM'>
36    <SHIPITEM>
37      <xsl:for-each select='ROWSET_ship1'>
38      <ROWSET_SHIP1>
39        <xsl:for-each select='ROW_ship1'>
40        <ROW_SHIP1>
41          <!-- Connection from source node "LineNumber" to destination node "LINENUMBER" -->
42          <LINENUMBER><xsl:value-of select='LineNumber/text( )'/></LINENUMBER>
43          <!-- Connection from source node "PO_NO" to destination node "ORDERNO" -->
44          <ORDERNO><xsl:value-of select='PO_NO/text( )'/></ORDERNO>
45          <!-- Connection from source node "SHP_PRD_NO" to destination node "PARTNO" -->
46          <PARTNO><xsl:value-of select='SHP_PRD_NO/text( )'/></PARTNO>
47          <!-- Connection from source node "ORD_QTY" to destination node "ORDERQTY" -->
48          <ORDERQTY><xsl:value-of select='ORD_QTY/text( )'/></ORDERQTY>
49          <!-- Connection from source node "REQ_DATE" to destination node "ORDERREQDATE" -->
50          <ORDERREQDATE><xsl:value-of select='REQ_DATE/text( )'/></ORDERREQDATE>
51          <!-- Connection from source node "SHIP_DATE" to destination node "SHIPDATE" -->
52          <SHIPDATE><xsl:value-of select='SHIP_DATE/text( )'/></SHIPDATE>
53          <!-- Connection from source node "SHIP_QTY" to destination node "WAFERQTY" -->
54          <WAFERQTY><xsl:value-of select='SHIP_QTY/text( )'/></WAFERQTY>
55          <!-- Connection from source node "LAST_DATE" to destination node "INVOICEDATE" -->
56          <INVOICEDATE><xsl:value-of select='LAST_DATE/text( )'/></INVOICEDATE>
57          <!-- Connection from source node "SO_NO" to destination node "INVOICENO" -->
58          <INVOICENO><xsl:value-of select='SO_NO/text( )'/></INVOICENO>
59          <!-- Connection from source node "REMARK" to destination node "NOTES" -->
60          <NOTES><xsl:value-of select='REMARK/text( )'/></NOTES>
61        <!-- Connection from source node "ROW_ship1" to destination node "ROW_SHIP1" -->
62        <xsl:value-of select='./text( )'/>
63        </ROW_SHIP1>
64        </xsl:for-each>
65      <!-- Connection from source node "ROWSET_ship1" to destination node "ROWSET_SHIP1" -->
66      <xsl:value-of select='./text( )'/>
67      </ROWSET_SHIP1>
68    </xsl:for-each>
69    <xsl:for-each select='ROWSET_shipMEMOS'>
70    <ROWSET_SHIPMEMOS>
71      <xsl:for-each select='ROW_shipMEMOS'>
72      <ROW_SHIPMEMOS>
73        <!-- Connection from source node "MEMONAME" to destination node "MEMONAME" -->
74        <MEMONAME><xsl:value-of select='MEMONAME/text( )'/></MEMONAME>
75        <!-- Connection from source node "MEMO" to destination node "MEMO" -->
76        <MEMO><xsl:value-of select='MEMO/text( )'/></MEMO>
77      <!-- Connection from source node "ROW_shipMEMOS" to destination node "ROW_SHIPMEMOS" -->
78      <xsl:value-of select='./text( )'/>
79      </ROW_SHIPMEMOS>
80    </xsl:for-each>
81    <!-- Connection from source node "ROWSET_shipMEMOS" to destination node "ROWSET_SHIPMEMOS" -->
82    <xsl:value-of select='./text( )'/>
83    </ROWSET_SHIPMEMOS>
84  </xsl:for-each>
85  <!-- Connection from source node "shipITEM" to destination node "SHIPITEM" -->
86  <xsl:value-of select='./text( )'/>
87  </SHIPITEM>
88 </xsl:for-each>
89 </INSERT>
90 </xsl:template>
91 </xsl:stylesheet>
```

After the input data has been mapped and stored as raw data as described above and in connection with TABLE 2, TABLE 3, TABLE 4 and TABLE 5, the mapped raw input data is then processed in the DATA INTEGRITY UNIT 88-6 including the Data Checking unit 88-6$_1$ and the Data Cleansing 88-6$_2$ to improve the quality of the raw data.

One of the significant barriers to efficient supply chain management is poor data quality. A large amount of the data is provided by suppliers for Fabless semiconductor buyers. The buyers and suppliers (together clients of the supply chain management system) are connected in common over the Internet and the suppliers supply local supplier information to said system via electronic records and reports. A record is a single entry at one time and reports reflect accumulated data from a number of records or other reports. The data integrity unit of FIG. 11 operates to process the raw data to obtain clean processed data. The clean processed data is checked for consistency with buyer's original local information as well as the local information provided by all the other suppliers in the supply chain.

The data integrity processing is divided into five parts:
Part 1. Data Consistency Within a Record.
Part 2. Data Consistency Within a Report.
Part 3. Data Consistency Across Different Reports from a Particular Supplier.
Part 4. Data Consistency Between Supplier and Buyer Data.
Part 5. Data Consistency Between Suppliers.

In connection with the different parts, the data relates to WIP (Work In Progress) Reports, activity-based Transaction Reports (TR) including Daily Transaction Reports (DTR), Orders including Purchase Orders (PO) and Work Orders (WO), Shipment Reports and Invoices.

For each of Part 1 to Part 5, cleansing is performed for Static Data Consistency and for Dynamic Data Consistency. By way of example, for Static Data Consistency, in a PO, the Lot No, and Part No are checked for consistency. By way of example, for Dynamic Data Consistency, Date Sequence, Quantity Sequence and Routing Sequence are checked.

In connection with Part 1, Data Consistency Within a Record, typically the following are checked:
1. Required Field Missing.
2. Date Sequence Check. For example, the sequence ordered date<=received date<=start date<=completed date<=shipped date is checked where "<=" means "is earlier than".
3. Quantity Sequence Check. For example, the sequence received qty≧start qty≧completed qty≧shipped qty is checked where "≧" means "is greater than or equal to".
4. Date out of Reasonable Range. For example, (current date-start date) is too large and estimated completion date is before the current date.
5. Quantity out of Reasonable Range. For example, scrap or downgrade quantity too big.
6. Status of a Lot Inconsistent with WIP Quantity.
7. Data Dictionary Check. Key data is included and cross-referenced. For example, device is not found in device master table, item number is not found in item master table, WIP status key word is not conformed to the pre-defined specification. A master dictionary for each type of A data is stored in the master table to enable checking to be performed.

As an example in connection with Part 2, Data Consistency Within a Report, the following are checked:
1. Duplicated Data Check. For example, the same lot appears in more than one record in a WIP or the same transaction appears twice in a DTR.
2. Date Sequence Error. For example, complete-out before receive-in transaction in DTR.
3. Status Sequence Error. For example, status sequence should be: (scheduled)<(active or hold)<(completed or closed)<(ship or closed) where "<" means prior to.

As an example in connection with Part 3, Data Consistency Across Different Reports from a Particular Supplier, the following are checked:
1. Data Content Inconsistency. For example, device or item has no changes for the same lot at a different date.
2. Quantity Inconsistency. For example, total quantity (WIP+scrap+warehouse) changes for the same lot on a different date.
3. Date Inconsistency. For example, start date or completion date changes for the same lot.
4. WIP Movement Error. For example, a lot has been completed then moves back to WIP.
5. Status Sequence Error. For example, a lot moves to complete before becomes active.
6. Abnormally Long Cycle Time.
7. Abnormally Low Yield.

As an example in connection with Part 4, Data Consistency Between Supplier and Buyer's Data, the following are checked:
1. Date Sequence Error. For example, a downstream supplier received before the upstream supplier shipped.
2. WIP Movement Error. For example, the same lot appears at two different suppliers at the same time.
3. Status Sequence Error
4. Abnormal Long Cycle Time
5. Shipped but Not Received
6. Shipped Quantity Does Not Equal Received Quantity As an example in connection with Part 5, Data Consistency Between Suppliers, the following are checked:
1. Consistency Between Purchase Order and Work Order. For example, device and item no should be consistent; sum of work order cost should be equal or less than the blanket purchase order amount.
2. Consistency Between WIP and Production Order. For example, Production Order No, Device, Item No, and Qty in WIP should match with the production order information.
3. Consistent Between DTR and Production Order. For example, production order no, device, item no, and qty in DTR should match with the production order information.
4. Consistency Between WIP and DTR. For example, the difference in WIP between the two consecutive dates should be equal to amounts shown in DTR.
5. Consistency Between DTR and Shipment Report.
6. Consistency Between DTR and Inventory. For example, the Inventory report should be equal to the results obtained by the cumulative DTR.

Figure 12:
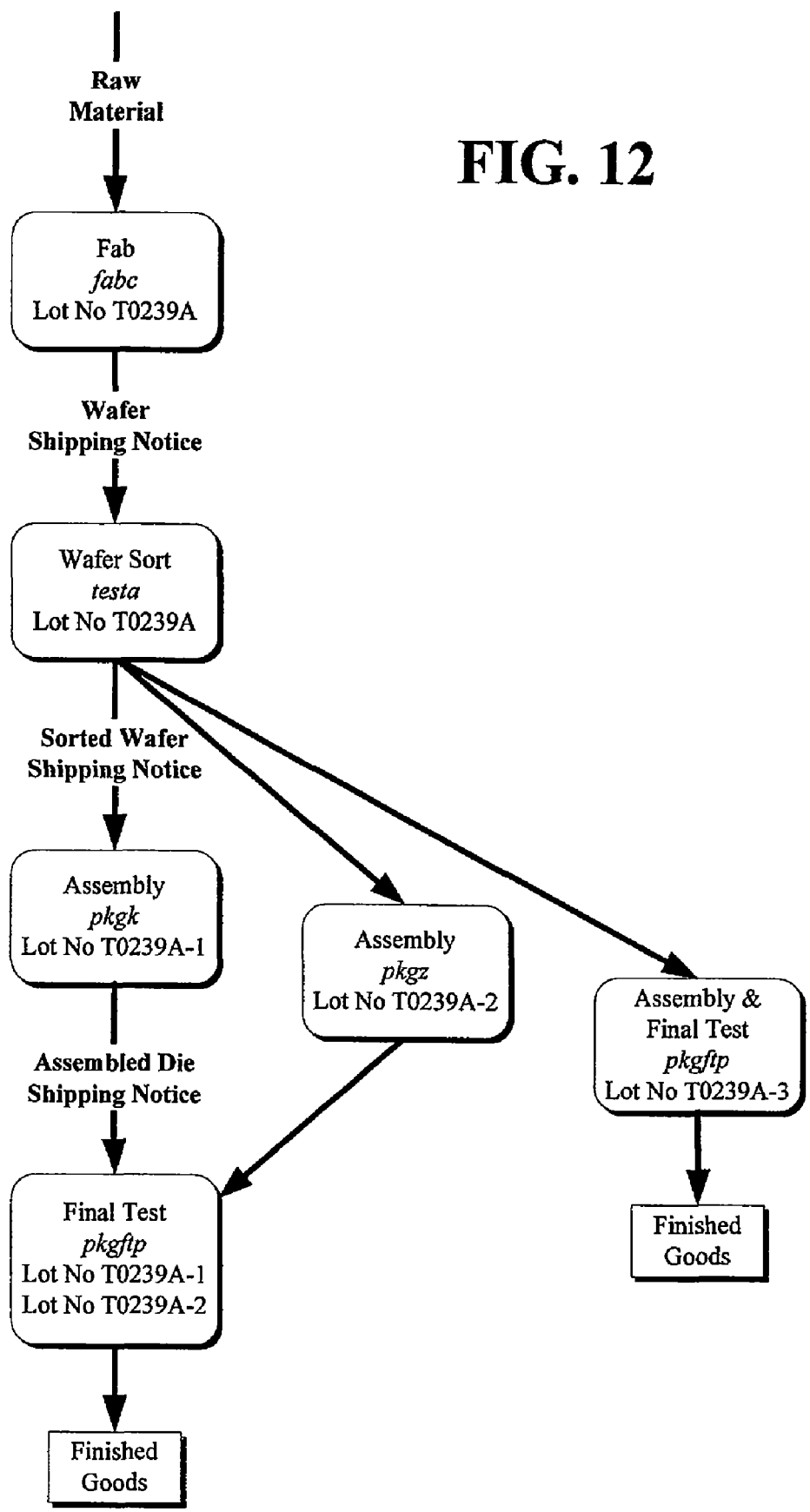
FIG. 12 depicts one example all of a multiple supplier branch in a supply chain transaction.

FIG. 12 depicts one example of a multiple supplier branch in a supply chain transaction where after the Wafer Sort stage by supplier testa, the Assembly stage for a lot is distributed to three suppliers, namely pkgk, pkgz and pkgftp.

In FIG. 12, the Raw Material is an input to the Fab stage at supplier fabc and Lot No T0239A is assigned. When the Fab stage work is complete, a Wafer Shipping Notice is issued and the wafers are delivered for the Wafer Sort stage to supplier testa for the Lot No T 0239A. When the Wafer Sort stage work is complete, a Sorted Wafer Shipping Notice is issued and the scribed wafers are delivered for the Assembly stage to Assembly supplier pkgk with Lot No T0239A-1 assigned, are delivered for the Assembly and Final Test stages to Assembly & Final Test supplier pkgz and Lot No T0239A-2 is assigned, and delivered for the Assembly and Final Test stages to Assembly & Final Test supplier pkgftp and Lot No T0239A-3 is assigned. When the Assembly supplier pkgk with Lot No T0239A-1 completes the packaging, a Assembled Die Shipping Notice is issued and the packaged devices are delivered for the Final Test stage to the Final Test supplier pkgftp with Lot No T0239A-1 retained. When the Final Test supplier pkgftp finishes the Final Test on Lot No T0239A-1, the Finished Goods are available. When the Final Test supplier pkgz finishes the Final Test on Lot No T0239A-2, the Finished Goods are available. When the Final Test supplier pkgftp and finishes the Final Test on Lot No T0239A-3, the Finished Goods are available.

Figure 13:
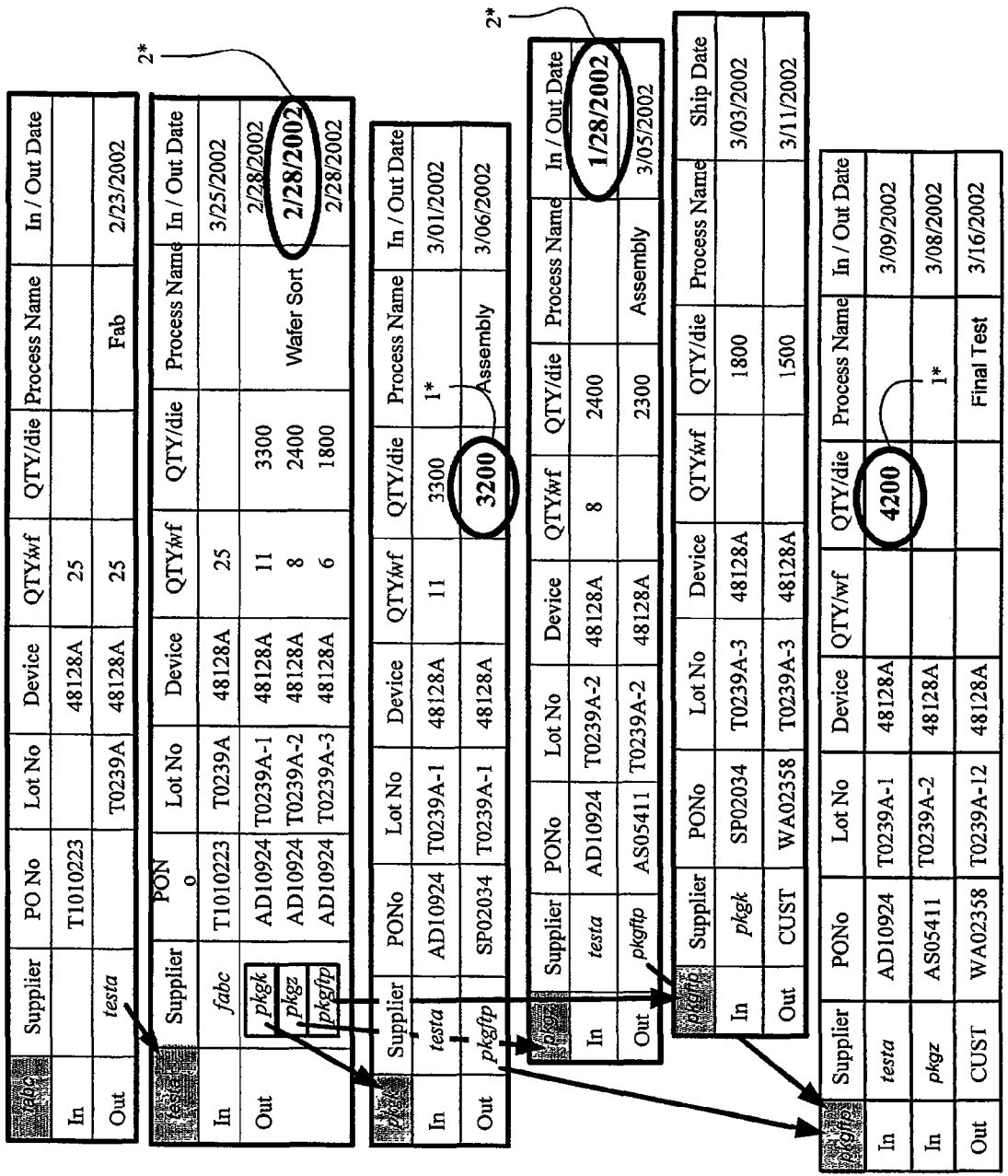
FIG. 13 depicts a cross supplier error checking in the example of FIG. 12.

FIG. 13 depicts cross supplier error checking in the example of FIG. 12. The Wafer Sort stage supplier testa for the Lot No T0239A-2 has an Out Date, indicated by 2\* in FIG. 13, of Feb. 28, 2002 where the designated supplier is pkgz. The supplier pkgz for the Lot No T0239A-2, however, has an In Date, indicated by 2\* in FIG. 13, of Jan. 28, 2002 which of course is an error since the goods could not have been received by pkgz before they were shipped by testa. This error is detected by the DATA INTEGRITY UNIT 88-6 of FIG. 11.

In FIG. 13, the Assembly stage supplier pkgk for the Lot No T0239A-1 has a QTY/die Out quantity, indicated by 1\* in FIG. 13, of 3200 where the designated supplier is pkgftp. The supplier pkgftp for the Lot No T0239A-1, however, has a QTY/die In quantity, indicated by 1\* in FIG. 13, of 4200 which of course is an error since more goods could not have been received by pkgftp then were shipped by pkgk. This error is detected by the DATA INTEGRITY UNIT 88-6 of FIG. 11.

FIG. 14 depicts one example of a lot tracking report. Lot Tracking is executed by the BUSINESS LOGIC 98-2 of FIG. 10 to store detailed information related to a lot in the production supply chain. The information tracked in the lot tracking has two categorizes as follows:

Category 1. Static Data: where the data are fixed during the manufacturing processes.
Category 2. Dynamic Data: where the data can be changed during the manufacturing processes.

The Static Data includes:
a) Lot number,
b) Part no,
c) Purchase order no,
d) Production order no,
e) Date code,
f) Supplier,
g) Routing,
h) Order date,
i) Order Qty,
j) Unit Price, The Dynamic Data includes two main parts, namely, Date Information and Qty Information where they have the following subparts:
a) Date Information:
1) Received date
2) Start date
3) Hold date
4) Completed date
5) Ship date
b) Qty Information
1) Received Qty
2) Returned Qty
3) Start Qty
4) Hold Qty
5) Completed Qty
6) Good part Qty
7) Scrap part Qty
8) Downgrade Qty
9) Ship Qty Lot tracking records the flow of a lot by keeping its genealogy in order to track the lot history. These records include a parent-child relationship for the unsplit lots and include a sibling relationship for split lots. Lot tracking information is loaded, for example, using WIP or DTR information. Lot tracking keeps a complete and consistent data set for all the production and finance related information in one central place, that is, in the 97'-2 of FIG. 11. With this common repository of lot information for the entire supply chain, performance checking (such as cycle time and yield analysis) and detailed cost reports down to the lot details are provided supply chain management system.

In lot tracking and as shown in the FIG. 14, the supply chain management system assigns a Base Lot indicator number to every lot. In FIG. 14, that Base Lot number is N1805 and a Lot No related to the Base Lot number is also kept so that the routing to and local identification for each of the suppliers is recorded in the lot tracking information. The particular Base Lot number N1805 of FIG. 14 has a ROUTE that traces the sequence Fab at supplier fabc with Base Lot number N1805, Wafer Sort at supplier testa with Base Lot number N1805, Assembly at supplier pkgk with Lot No N18058 and Final Test at supplier pkgftp with Lot No N18058.1, with Lot No N18058.2 and with Lot No N18058.3.

Figure 15:
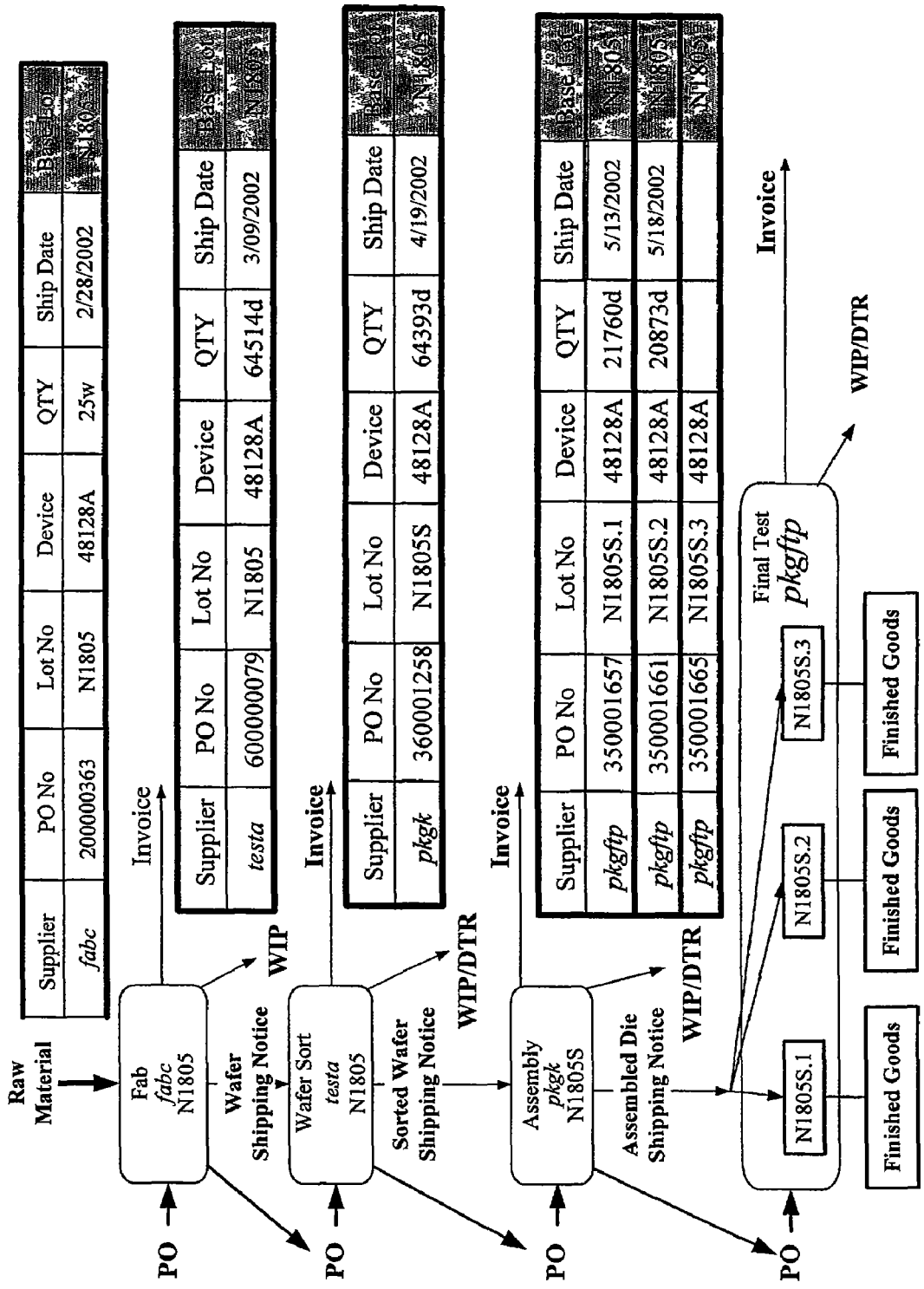
FIG. 15 depicts a cross supplier lot tracking example 1.

FIG. 15 depicts a first cross supplier lot tracking example. In FIG. 15, the Raw Material is an input to the Fab stage at supplier fabc and Lot No N1805 is assigned. When work at the Fab stage is complete, a Wafer Shipping Notice is issued and the wafers are delivered for the Wafer Sort supplier testa for the Lot No N1805. When the Wafer Sort stage work is complete, a Sorted Wafer Shipping Notice is issued and the sorted wafers are delivered for the Assembly stage to Assembly supplier pkgk with Lot No N1805S assigned. When the Assembly supplier pkgk with Lot No N1805S completes the packaging, an Assembled Die Shipping Notice is issued and the packaged devices are delivered for the Final Test stage to the Final Test supplier pkgftp with Lot No N1805S.1, Lot No N1805S.2 and Lot No N1805S.3 assigned. When the Final Test supplier pkgftp finishes the Final Test on Lot No N1805S.1, Lot No N1805S.2 and Lot No N1805S.3, the Finished Goods are available for each of those lots.

Figure 16:
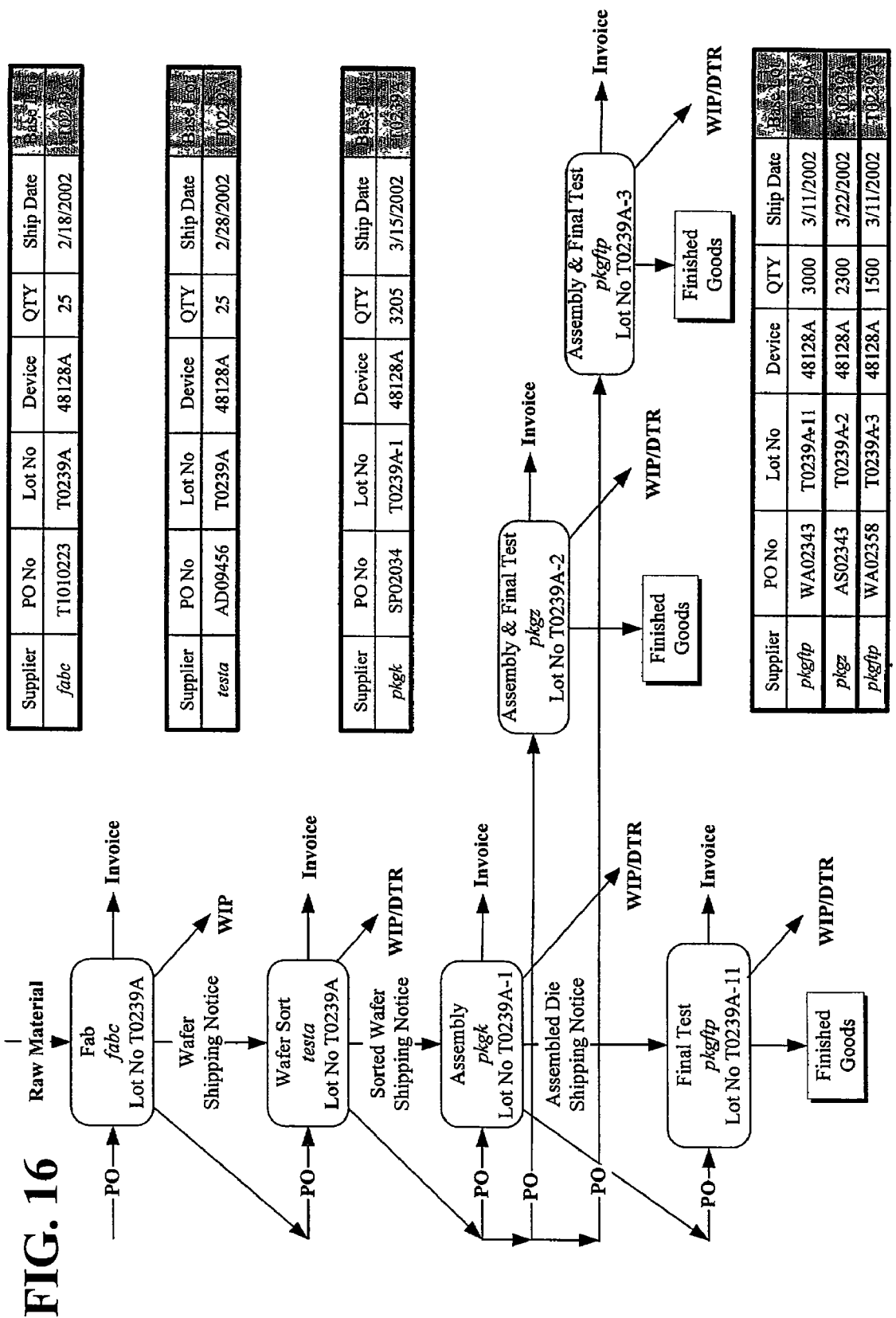
FIG. 16 depicts a cross supplier lot tracking example 2.

FIG. 16 depicts a second cross supplier lot tracking example. In FIG. 15, the Raw Material is an input to the Fab stage at supplier fabc and Lot No T0239A is assigned. When the Fab stage work is complete, a Wafer Shipping Notice is issued and the wafers are delivered for the Wafer Sort stage to supplier testa for the Lot No T0239A. When the Wafer Sort stage work is complete, a Sorted Wafer Shipping Notice is issued and the sorted wafers are split into three orders and are delivered for the Assembly stage to Assembly supplier pkgk with Lot No T0239A-1 assigned, are delivered for the Assembly stage to Assembly supplier pkgz with Lot No T0239A-2 assigned and are delivered for the Assembly stage to Assembly supplier pkgftp with Lot No T0239 A-3 assigned. When the Assembly supplier pkgk with Lot No N1805S completes the packaging, a Assembled Die Shipping Notice is issued and the packaged devices are delivered for the Final Test stage to the Final Test supplier pkgftp with Lot No N1805S.1, Lot No N1805S.2 and Lot No N1805S.3 assigned. When the Final Test supplier pkgftp finishes the Final Test on Lot No N1805S.1, Lot No N1805S.2 and Lot No N1805S.3, the Finished Goods are available for each of those lots.

FIG. 17 depicts an Actual Cost—Lot Detail Report for the Lot No N18005S.1 from Final Test Supplier pkgftp of FIG.

15. The ability of the supply chain management system to run the FIG. 15 reports results from the Lot Tracking that is performed. In order to perform Lot Tracking, the mapping of fragmented information among multiple Suppliers is required. The accuracy of the report depends on the accuracy of the information and hence the data integrity processing is important to report accuracy.

Figure 18:
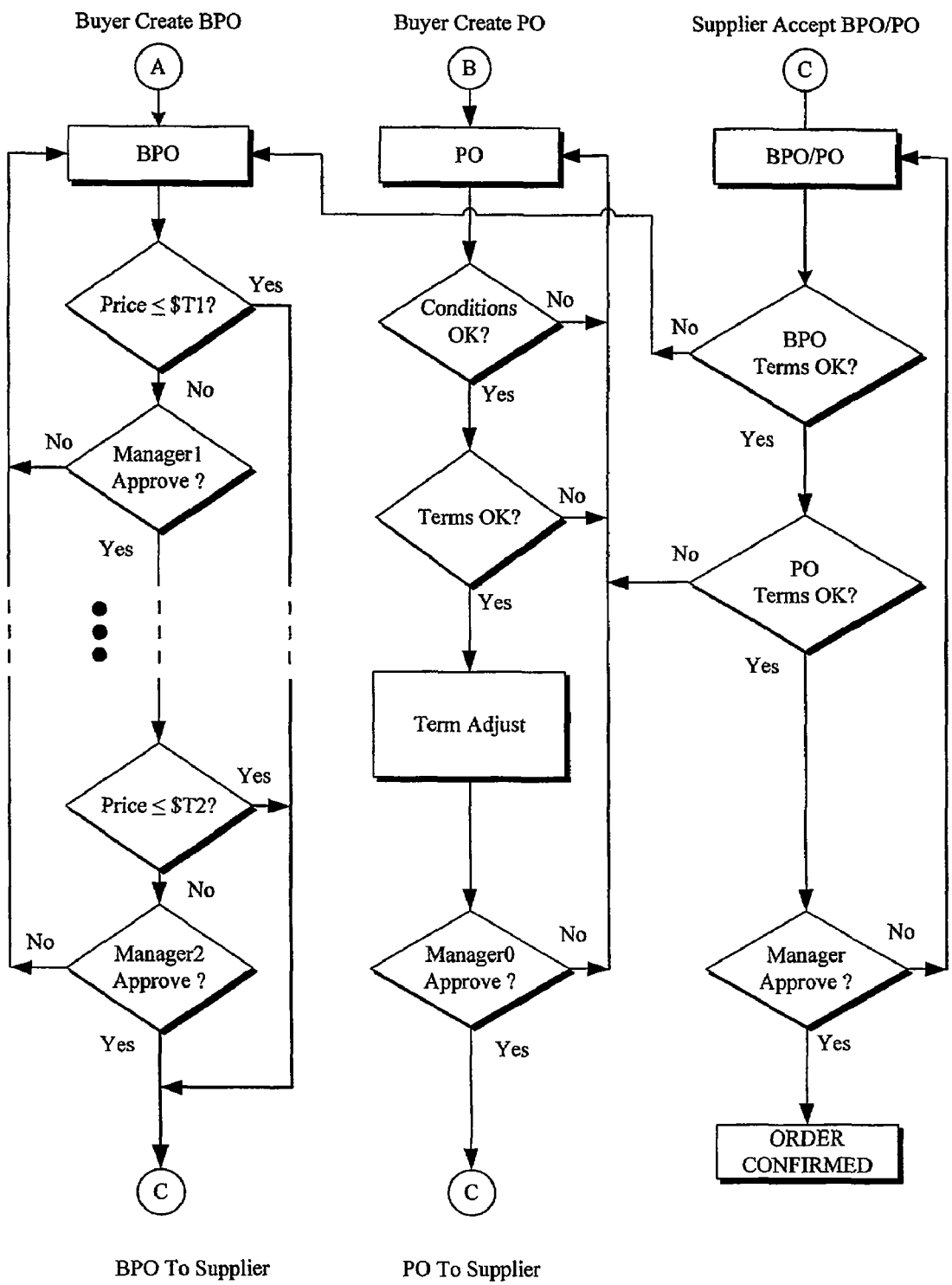
FIG. 18 depicts the purchase order logic flow for creation and acceptance of blanket purchase orders and purchase orders.

FIG. 18 depicts the purchase order logic flow for creation and acceptance of orders. Such orders are of the type described in connection with FIG. 5, FIG. 6 and FIG. 7 where a buyer issues a set of dependent purchase orders in order to progress Raw Materials to Finished Product. As a first step, a Buyer will initiate the process Buyer Create BPO entry at A to create a blanket purchase order. The terms of the BPO are set and may be a standard contract with standard terms and conditions of the Buyer. Normally, the BPO undergoes one or manger approvals for the Buyer usually based upon price thresholds for each manager. The higher the price, the more management levels that may be required. No Manager1Approve ? is required if the price is less than a first threshold, Price≦$T1, and a Yes results sending the BPO to the Supplier input C. If the BPO price is not less than a first threshold, Price≦$T1, and a No results, a Manager1 Approve ? is required and if a No results, a return is made for further adjustment of the BPO. If a Manager1Approve ? is required and is Yes, the approval process continues for one or more additional approvals. For example, when no Manager2Approve ? is required (the price is less than a second threshold, Price≦$T2) and a Yes results sending the BPO to the Supplier input C. If the BPO price is not less than a second threshold, Price≦$T2, and a No results, a Manager2Approve ? is required and if a No results, a return is made for further adjustment of the BPO. If a Manager2Approve ? is required and is Yes, the approval process continues for one or more additional approvals. Assuming Manager2Approve ? is the last required and a Yes results sending the BPO to the Supplier input C.

If a BPO exists, or in the absence of a BPO if one is not to be used, a Buyer from time to time will initiate the process Buyer Create PO entering at B to create a purchase order. The terms of the PO are set and may be a standard contract with standard terms and conditions under the BPO of the Buyer or otherwise. As a first step, a Conditions OK? check is made to make sure that conditions are properly established for the PO. If the current PO is dependent upon the output of another stage, perhaps from a different Supplier, the conditions precedent for the PO are checked and if satisfied, a Yes will forward to a Terms OK? check and if not a No will return to PO for further processing. As a second step, a Terms OK? check is made to make sure that terms of the PO are correct. For example, if the PO is under a BPO, then a check is typically made to determine if the quantity and cost is within the balance remaining on the BPO. If the terms for the PO are checked and if satisfied, a Yes will forward to a Terms Adjust where, for example, the amount of the current PO will decrement the balance remaining on the BPO. If the Terms OK? check is not satisfactory, a No will return to PO for further processing. Normally, the PO undergoes one manger approval Manager0 Approve? and if a Yes results, the processing is sent to the Supplier input C and if No, process is sent to PO for further processing of the PO When a Supplier receives a Supplier Accept BPO/PO input, entering at C to create approval of a Buyer purchase order. The terms of the PO are set and may be a standard contract with standard terms and conditions under the BPO of the Buyer or otherwise. As a first step, a BPO Terms OK? check is made to make sure that terms are properly established for the PO or BPO. If the terms of the BPO are OK, a Yes will forward to a Terms OK? check and if not a No will return to BPO/PO for further processing. As a second step, a PO Terms OK? check is make to make sure that the terms of the PO are correct and if Yes will forward processing for manager approval. If the Terms OK? check is not satisfactory, a No will return to BPO/PO for further processing. Normally, the PO undergoes one manger approval Manager Approve? and if a Yes results, the processing terminates with Order Confirmed.

FIG. 19 depicts an example of Final Test Purchase Order. The PO of FIG. 19 is in an on-line form to Supplier pkgftp and includes in the lower right-hand corner a thumbnail image of an attachment that details certain aspects of the PO. The ability of the supply chain management system to run reports of the FIG. 19 type relies upon the Lot Tracking facility. In order to perform Lot Tracking, the supply chain management system maps fragmented information that inherently is fragmented among multiple Suppliers since there is no agreed upon standard in the industry. As described, the local information for each client (Buyers and Suppliers) is mapped with reference to a master table that constitutes a super set of all the local tables for each of the clients. The accuracy of each report depends on the accuracy of the mapped information and hence the data integrity processing is important in order to be able to have reporting accuracy among multiple Suppliers and among multiple Buyers and multiple Suppliers.

Figure 20:
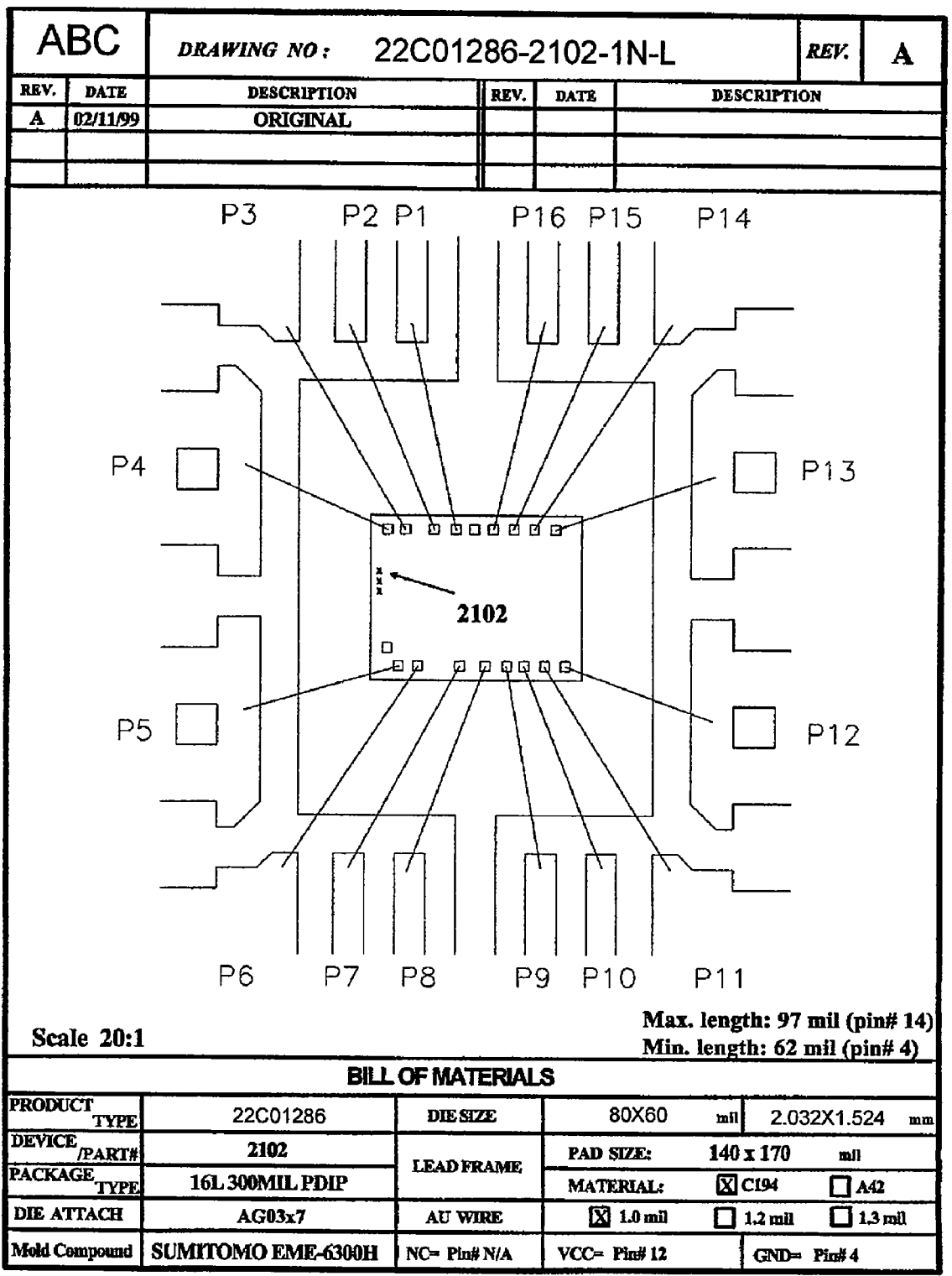
FIG. 20 depicts an example of an attachment that appears as a thumbnail image in the Final Test purchase order of FIG. 19.

FIG. 20 depicts an example of the attachment that appears as a thumbnail image in the Final Test Purchase Order of FIG. 19.

FIG. 21 depicts an example of a Wafer Rolling Output Report. The ability of the supply chain management system to run reports of the FIG. 21 type relies upon the Lot Tracking facility. In order to perform Lot Tracking, the supply chain management system maps fragmented information that inherently is fragmented among multiple Suppliers since there is no agreed upon standard in the industry. As described, the local information for each client (Buyers and Suppliers) is mapped with reference to a master table that constitutes a super set of all the local tables for each of the clients. The accuracy of each report depends on the accuracy of the mapped information and hence the data integrity processing is important in order to be able to have reporting accuracy among multiple Suppliers and among multiple Buyers and multiple Suppliers.

FIG. 22 depict an example a Finished Goods Rolling Output Report. The ability of the supply chain management system to run reports of the FIG. 22 type relies upon the Lot Tracking facility. In order to perform Lot Tracking, the supply chain management system maps fragmented information that inherently is fragmented among multiple Suppliers since there is no agreed upon standard in the industry. As described, the local information for each client (Buyers and Suppliers) is mapped with reference to a master table that constitutes a super set of all the local tables for each of the clients. The accuracy of each report depends on the accuracy of the mapped information and hence the data integrity processing is important in order to be able to have reporting accuracy among multiple Suppliers and among multiple Buyers and multiple Suppliers.

FIG. 23 depicts an example a Work in Progress Inventory Report. The ability of the supply chain management system to run reports of the FIG. 23 type relies upon the Lot Tracking facility. In order to perform Lot Tracking, the supply chain management system maps fragmented information that inherently is fragmented among multiple Suppliers since there is no agreed upon standard in the industry. As described, the local information for each client (Buyers and Suppliers) is mapped with reference to a master table that constitutes a super set of all the local tables for each of the clients. The accuracy of each report depends on the accuracy of the mapped information and hence the data integrity processing is important in order to be able to have reporting accuracy among multiple Suppliers and among multiple Buyers and multiple Suppliers.

In the supply chain management system, an alert process is provided that extends across the multiple Suppliers environment and the multiple Buyers and multiple Suppliers environment. Typically, a Buyer having an integrated circuit (IC) design relies upon Production Engineers, Production Control Engineers or other Production Control (PC) personnel to find problems and exceptions that require action or correction during manufacture and procurement. Procurement from a manufacturing supply chain having multiple dependent suppliers, that is, where the output from one Supplier is the input for other Suppliers, has increased complexity when compared with less interdependent supply chains. If a Buyer can only use the Finished Product to solve problems, the job is tedious and error prone. The alert function is robust and extends to all stages in the supply chain. The alert function as one of the supply chain management functions greatly enhances problem identification and correction in the supply chain.

The supply chain management system performs alert processes based upon alert conditions for specific events/reports/process. The alert conditions are selected by clients. Alert reports are accessible to clients through onscreen operations or through other i-commerce methods of communication. Typically, alert conditions are communicated daily (or more frequently if desired) from the supply chain management system to clients in the form of event generation and alert messages.

By way of an example for the alert functions, it is assumed for purposes of explanation that for a particular part (PROD), in the process of P, the standard production cycle time is X days. The production control (PC) personnel, or production control (PC) agent if an automated computer system, of a client specifies that if the real cycle time is longer than the standard cycle time by Y days, the client is to be alerted. The supply chain management system implements the algorithm as follows in TABLE 6:

TABLE 6

Store info by PROD, P, X (static info)
Store info by PC, Y (Client dependent)
Periodically check the rule (for example, each time a production report
    enters the supply chain management system) as follows:
  If report has product PROD
    If report is for process P
      If reported completion time − start time > X
        Store this record into Cycle > stdCycleTime
          With CycleTime = completion time − start time
          With product = PROD
          With process = p
When client (PC) accesses report,
  If client is PC
    List any existing records in stdCycleTime
      Where product = PROD
      AND process = p
      AND CycleTime > Y.

The implementation of TABLE 6 is suitable for both standard reports and client preferences for improved performance.

Alerts are divided into categories:
1) Abnormal time lapse:
  a. Long Queue-in Time: The Queue-in Time is the period from receiving material (Received Date) to the start of the production (Start Date). A Long Queue-in Time is when the Queue-in Time is longer than a specified period. Usually a Long Queue-in Time results from a constraint in production capacity or a delay in paper work.
  b. Long In-process Time: The In-process Time is the amount of time in a production process, WIP, and a Long In-process Time is when the In-process Time is taking an abnormally long time.
  A Buyer or other client may define a threshold for 'long cycle time' (per routing stage) and the supply chain management system reports any active WIP beyond the specified threshold as a Long In-process Time.
  c. Long On-hold Time: The On-hold Time is time when a production process, WIP, is put on hold due to a quality issue, a machine setup problem, a buyer request or other reason. A Buyer or other client may define a threshold for 'long hold time' (per routing stage) and the supply chain management system reports any active WIP beyond the specified threshold as a Long On-hold Time.
  d. Long In-house Warehouse Time: During and after the production process, WIP, the materials or finished goods are usually put in the supplier's warehouse for temporary storage. This storage is called In-house Warehouse Time (also Die/Wafer bank time). A Long In-house Warehouse Time is when the In-house Warehouse Time is too long. A Buyer or other client may define a threshold for 'long in-house warehouse time' and the supply chain management system reports any storage beyond the specified threshold as a Long In-house Warehouse Time.
  e. Long In-transit Time: The In-transit Time is the time lapse between the shipping of one supplier to the receiving of the following supplier. In-transit goods and materials generally are the most difficult to track in a supply chain. A Buyer or other client may define a threshold for 'in-transit time' and the supply chain management system reports any storage beyond the specified threshold as a Long In-transit Time. The supply chain management keeps a log of how long it takes from shipping to receiving at each stage.
  f. Early Complete Notice—An early warning (x-days before the estimated completion date) is provided to enable a PC to start planning the production flow. This feature is important for Fab and Wafer Sort stages.
  g. Stationary Lot Report—A log to show lot movement during a given period.
2) Abnormal yield
  a. Low Yield Threshold is defined by the Buyer or other client. The supply chain management system tracks yield down to per device, per part number, per supplier and identifies low yield.
  b. Excess Yield Threshold. Sometimes, a supplier reports the output quantity larger than reasonable, such as greater than the input quantity causing a yield greater than 100%.
3) Order and invoice
  a. Missing PO. When material is set aside for a manufacturing process, the accompanying PO has to be there for suppliers to start the work. However, this is not always done. The supply chain management system generates alerts for PC in these cases. The trigger can be set in any stage of the production flow: for example, when the upstream process is completed, or when the upstream production is shipped, or when the material is received.

b. Cost Approval Delay. When the production process is finished, the cost needs to be calculated and approved by PCs. If the cost calculation and approval process has too great a delay, it is difficult for PC to reconcile this info with the real production data, since it has been done a long time ago. The supply chain management system brings the cost calculation and approval process to alert the PC as soon as a particular process is done, it can reduce the future dispute and control the production cost. N c. Cost Deviation. If the unit cost of a particular unit is larger than a particular percentage of the standard cost for such unit, the supply chain management system will bring alert the PC, it can either be due to a low yield, or due to high unit cost.

d. Received but PO Not Issued—Lot received but PO has not been issued.

e. Shipped but PO for next Stage Not Issued—Lot shipped but PO has not been issued for the following supplier.

f. Completed but PO Not Closed—WIP status is completed and PO is not closed.

g. Completed but Invoice Not Approved—WIP status is completed, invoice is received and waiting for approval.

h. Wip Quantity Larger than Ordered Quantity—WIP quantity should be equal or less than order quantity, this check is particularly important for foundry PO/WIP reconciliation.

4) Performance Index (After the production is done):

a. Yield Report—per device, part number, routing and supplier.

b. Cycle Time Report—per device, part number, routing and supplier.

The supply chain management system employs planning based upon upstream visibility in the supply chain. Such capabilities are particularly useful in outsourcing to suppliers in a semiconductor supply chain. In the semiconductor IC-design outsourcing industry, the buyer (IC-design house) deals with multiple suppliers that provide various outsourcing functions at different supplier stages. The buyer places a separate order (Purchase Order) with each supplier. Although the Purchase Orders are separate between a buyer and each supplier, each supplier depends on the previous supplier (upstream supplier) in the supply chain. In order to procure a chip as finished goods, a buyer first orders wafers from a Fab supplier (foundry); once the work at the Fab supplier is finished, the buyer orders sorting from a Wafer Sort supplier; after the Wafer Sort work is finished, the buyer orders Assembly from an Assembly supplier; and finally, the buyer orders Final Test from a Final Test supplier. The supply chain management system, for example, is able to perform group order generation for groups of dependent suppliers (Fab, Wafer Sort, Assembly and Final Test suppliers) in the supply chain.

At each step of the supply chain, a downstream supplier waits for the previous upstream supplier to complete (or partially complete) its work before commencement of work under a new order can begin. The supply chain management system allows the buyer to create virtual downstream orders once upstream orders are underway. The supply chain management system uses estimated date (and continuously update as more up to date info is provided with the WIP data), to create virtual (future) orders for the downstream suppliers.

Besides providing the buyer with order creation, the supply chain management system also provides the suppliers with up to date information regarding up coming orders. Downstream suppliers can use the supply chain management system to view the current status of the materials, which will eventually be arriving and requiring their services.

In an example for describing the operation, a buyer has a requirement for final goods (FG) of amount Q chips on date D. Based upon this information, the supply chain management system operates as in the following TABLE 7:

TABLE 7

Calculate the initial wafer required:
    Using Bill of Routing:
        FG is made from FT-FG in Final Test with standard yield
           Yft, standard cycle time Dft, by supplier Sft,
        Thus the date and quantity to start FT is:
           Q-FT = Q / Yft
           FTD = D − Dft
        FT-FG is made from AS-FG in Assembly with standard yield
           Yas, standard cycle time Das, by supplier Sas,
        Thus the date and quantity to start AS is:
           Q-AS = Q-FT / Yas = Q / Yft / Yas
           ASD = FTD − Das = D − Dft − Das
        AS-FG is made from WS-FG in Wafer Sort with standard yield
           Yws, standard cycle time Dws, by supplier Sws,
           Q-WS = Q-AS / Yws = Q / Yft / Yas / Yws
           WSD = ASD − Dws = D − Dft − Das − Dws
        WS-FG is made from FD-FG in Foundry, with wafer to die ratio
           W2D, with standard cycle time Dfd, by supplier Sfd,
        Thus the date and quantity to start FD is:
           Q-FD = Q-WS / W2D = Q / Yft / Yas / Yws / W2D
           FDD = WSD − Dfd = D − Dft − Das − Dws − Dfd
        (for each lot there are 25 wafers)
           QL-FD = Q-FD / 25

According to TABLE 6, the supply chain management system will generate orders for each of the suppliers with the proper quantity and required date (WS/AS/FT work orders are lot based).

Since the supply chain management system is connected to the supply chain management system Lot Tracking engine, which keeps track on all the WIP data, the supply chain management system will constantly update the Quantity and Date information in each of the subsequent orders.

Once those orders are generated, the buyer will be notified a few days (user specified) before the next order is needed to be submitted to the supplier. The user can then come to the supply chain management system and reconfirm the order and submit it. The entire process is automatic and accurate, and greatly increases the productivity of PC personnel of the IC-design company.

While the invention has been particularly shown and described with reference to preferred embodiments thereof it will be understood by those skilled in the art that various changes in form and details may be made therein without departing from the scope of the invention.

The invention claimed is:

1. A system comprising:
a first processor readable storage device having processor readable code embodied on said first storage device, said processor readable code for programming one or more servers to perform a method comprising:
receiving local processing information from a plurality of suppliers;
translating local processing information to a standard format;
correlating said processing information to a finished goods requirement;
transmitting to one or more supplier information systems a portion of a multi-lot production information, said portion responsive to said correlating;
generating one or more purchase orders in response to said correlating;

presenting the purchase orders on a workstation for approval;

wherein the correlating includes matching processing information from earlier-stage suppliers to later-stage suppliers and from later-stage suppliers to finished goods, and the work orders direct suppliers to move product through a supply chain; and a second processor readable storage device coupled to the first storage device, said second storage device having processor readable code embodied on said second storage device, said processor readable code for programming one or more clients to perform a method comprising:

transmitting to a server local processing information;

receiving from a server one or more work order;

presenting on a display device the work order for approval, and adjusting the local processing information in response to the work order.

2. The system of claim 1 wherein
the local processing information includes at least one of quantity on hand, work in progress, processing time, processing capacity and time to completion.

3. The system of claim 1 wherein
the finished good requirement includes at least one of quantity, delivery date, delivery method and development stage.

4. The system of claim 1 wherein
the method encoded on the first storage device also includes:
comparing historical compliance with work orders, and
tailoring the work order in response to said comparing.

* * * * *